United States Patent
Lynch et al.

(10) Patent No.: US 8,451,124 B2
(45) Date of Patent: May 28, 2013

(54) PASSIVE WIRELESS READOUT MECHANISMS FOR NANOCOMPOSITE THIN FILM SENSORS

(75) Inventors: Jerome P. Lynch, Ann Arbor, MI (US); Nicholas A. Kotov, Ypsilanti, MI (US); Kenneth J. Loh, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 1059 days.

(21) Appl. No.: 12/209,330

(22) Filed: Sep. 12, 2008

(65) Prior Publication Data

US 2009/0121872 A1    May 14, 2009

Related U.S. Application Data

(60) Provisional application No. 60/994,030, filed on Sep. 14, 2007.

(51) Int. Cl.
*G08B 13/14* (2006.01)

(52) U.S. Cl.
USPC ............... 340/572.5; 340/572.1; 340/568.1; 977/956; 977/953

(58) Field of Classification Search
USPC .. 340/572.1, 572.5, 665, 568.1; 977/953–960
See application file for complete search history.

(56) References Cited

U.S. PATENT DOCUMENTS

| 7,155,343 | B2* | 12/2006 | Grant et al. ...................... 702/2 |
| 2006/0138575 | A1* | 6/2006 | Kamins ......................... 257/419 |
| 2008/0287589 | A1* | 11/2008 | Ounaies et al. ................. 524/495 |
| 2009/0027036 | A1* | 1/2009 | Nuckolls et al. .............. 324/76.11 |
| 2010/0021993 | A1* | 1/2010 | Wang et al. .................. 435/286.1 |
| 2010/0089772 | A1* | 4/2010 | Deshusses et al. ............. 205/781 |
| 2010/0108988 | A1* | 5/2010 | Grebel et al. ..................... 257/24 |
| 2010/0283024 | A1* | 11/2010 | Yoshizumi ......................... 257/2 |

OTHER PUBLICATIONS

Dharap, Prasad et al.; "Nanotube film based on single-wall carbon nanotubes for strain sensing", Institute of Physics Publishing, Nanotechnology 15 (2004) pp. 379-382.

Franklin, Nathan R.; "Integration of suspended carbon nanotube arrays into electronic devices and electromechanical systems", Applied Physics Letters, vol. 81, No. 5, Jul. 29, 2002, pp. 913-915.

Jia, Yi et al.; Thick Film Wireless and Powerless Strain Sensor, Smart Structures and Materials 2006; Proc. of SPIE vol. 6174, 61740Z, (2006).

(Continued)

*Primary Examiner* — Hai Phan
*Assistant Examiner* — Hongmin Fan
(74) *Attorney, Agent, or Firm* — Harness, Dickey & Pierce, P.L.C.

(57) ABSTRACT

A method for sensing a stimulus comprising providing a sensing assembly having a first structure and a second structure, wherein the first structure is made of a material different than the second structure and each of the first structure and the second structure is nanoscale. The method further includes providing an inductive antenna operably coupled to the sensing assembly, disposing the sensing assembly upon a spatial area, exposing the sensing assembly to the stimulus thereby producing a detectable change in the sensing assembly, and wirelessly coupling a reader with the inductive antenna to obtain a signal representative of the detectable change in the sensing assembly.

19 Claims, 19 Drawing Sheets

OTHER PUBLICATIONS

Jiang, Chaoyang et al.; "Collective and Individual Plasmon Resonances in Nanoparticle Films Obtained by Spin-Assisted Layer-by-Layer Assembly", Langmuir, 2004, 20 (3), 882-890.

Kang, Inpil et al.; "A carbon nanotube strain sensor for structural health monitoring", Institute of Physics Publishing, Smart Mater. Struct. 15 (2006) pp. 737-748.

Loh, Kenneth J. et al.; "Design and Validation of Carbon Nanotube Thin Film Wireless Sensors for pH and Corrosion Monitoring", Proceedings of the ASME Conf. on Smart Materials, Adaptive Structures and Intelligent Systems, Oct. 28-30, 2008.

Loh, Kenneth J. et al.; "Inductively coupled nanocomposite wireless strain and pH sensors", Smart Structures and Systems, vol. 4, No. 5 (2008) pp. 531-548.

Loh, Kenneth J. et al.; "Multifunctional layer-by-layer carbon nanotube-polyelectrolyte thin films for strain and corrosion sensing", IOP Publishing, Smart Mater. Struct. 16 (2007) pp. 429-438.

Loh, Kenneth J. et al.; "Tailoring Piezoresistive Sensitivity of Multilayer Carbon Nanotube Composite Strain Sensors", Journal of Intelligent Material Systems and Structures 2008; 19; pp. 747-764.

Mita, Akira et al.; "Health monitoring of smart structures using damage index sensors", Smart and Materials 2002; Proceedings of SPIE vol. 4696 (2002).

Simonen, Jarkko T. et al.; "Wireless sensors for monitoring corrosion in reinforced concrete members", Smart Structures and Materials 2004; Proc. of SPIE vol. 5391 (2004).

* cited by examiner

PASSIVE WIRELESS READOUT MECHANISMS FOR NANOCOMPOSITE THIN FILM SENSORS

CROSS-REFERENCE TO RELATED APPLICATIONS

This application claims the benefit of U.S. Provisional Application No. 60/994,030, filed on Sep. 14, 2007. The entire disclosure of the above application is incorporated herein by reference.

GOVERNMENT SUPPORT

This invention was made with government support under Grant Number CMS0528867 awarded by the National Science Foundation. The government has certain rights in the invention.

BACKGROUND AND SUMMARY

This section provides background information related to the present disclosure which is not necessarily prior art. This section further provides a general summary of the disclosure, and is not a comprehensive disclosure of its full scope or all of its features.

Around the world, civil infrastructures such as buildings, bridges, lifelines, among others, represent the foundation for economic welfare and societal prosperity. Many of these vital structures are beginning to approach (or have already exceeded) their design service lifetimes. Today, $91 billion is spent annually to maintain the U.S. inventory of highways and bridges; however, an additional $128 billion is needed to upgrade existing structures to current standards. As such, efficient and cost-effective strategies are required to ensure infrastructure serviceability and safety. In most cases, the current state of practice relies on schedule-based maintenance routines in which engineers rely on visual inspection to assess structural performance. Not only is this method subjective, but a schedule-based maintenance program is often economically inefficient, as newer structures may not need inspection during their initial years of service.

As a result, many researchers have proposed tethered sensor networks for monitoring structural performance over time, commonly termed structural health monitoring (SHM). Using a few distributed sensors (e.g. accelerometers) installed within the civil infrastructure then coupled with automated damage detection algorithms at the centralized data repository, a comprehensive SHM system can be formed. Structural health monitoring can objectively monitor long-term structural reliability and serviceability. However, the high costs to install and maintain the extensive coaxial cables connecting sensors to the centralized data repository have warranted novel cost-effective methods for SHM. For example, the cost to install tethered sensors in tall buildings and long bridges can exceed thousands of dollars on a per channel basis. High system costs result in low sensor densities in large-scale civil infrastructures; as a result, generally only global vibration characteristics are deduced from so few sensors. Nevertheless, the advent of tethered sensors for SHM has initiated the shift from schedule-based to performance-based monitoring.

Instead of using cable-based sensors for global vibration structural characterization, a variety of academic and commercial wireless sensor networks have been proposed for densely distributed SHM systems. Costing approximately $100 per sensing node, low wireless sensor costs permit high nodal densities for component-level damage detection (e.g. monitoring strain and corrosion processes). Furthermore, with local computational power embedded within each sensor node, distributed data processing and wireless structural control have been achieved. Numerous field validation studies conducted with wireless sensors have indicated performance levels comparable with traditional cable-based monitoring systems. Unfortunately, one significant disadvantage of the aforementioned wireless sensors is their inherent dependency on power supplies (e.g. batteries or AC power source). To conserve power, some researchers have adopted trigger-based power-on mechanisms (i.e. when acceleration exceeds a preset threshold) as well as local data processing to solely transfer computed results (as opposed to the entire time history record) to reduce power consumed by the wireless transceiver. These efforts have only led to moderate improvements in sensor service lifetimes with life expectancy to approximately two years. Furthermore, while methods for converting ambient mechanical vibration into electrical energy are currently underway, the field of power harvesting is still in its infancy.

In order to preserve the advantages offered by wireless sensing while simultaneously addressing issues regarding power limitations, some researchers have adopted inductively coupled radio frequency identification (RFID) sensing systems for strain and corrosion monitoring. Through the use of a coil antenna wirelessly coupled to an AC (alternating current) generator (i.e. the reader), one can inductively power and communicate with a remote passive sensor circuit in close proximity. Early investigatory work in RFID sensing has been proposed where they have developed a passive wireless peak strain sensor based on two concentric aluminum pipes sliding over a dielectric material. Upon installing these sensors to the base of a seven-story base-isolated building, experimental peak strain data collected from the prototype RFID sensor coincides with those obtained from a laser displacement transducer. Extension to this work seeks the utilization of MEMS (microelectromechanical systems) processes to miniaturize the capacitive peak strain sensor. As opposed to measuring peak strain, some systems have developed a passive thick film strain sensor by incorporating poly(vinyl fluoride) with an interdigital capacitor to enhance the sensitivity of characteristic frequency shifts to strain. On the other hand, for monitoring corrosion processes, some systems have developed a 2.4 GHz RFID wireless sensor to detect the loss of interfacial bond strength and reduction in steel-reinforcement cross-sectional area in concrete via acoustic emissions. To accurately monitor different thresholds of concrete corrosion wirelessly, some systems utilize an exposed switch fabricated with different gauge steel wires. When corrosion destroys the exposed wire switch, dramatic characteristic frequency shifts have been observed between initial and corroded states. Unfortunately, among the wide variety of RFID-based strain and corrosion sensors that exist, most have a large form factor and are derived by miniaturizing mechanical elements.

According to the principles of the present teachings, a prototype thin film passive wireless strain and pH sensor is provided for localized strain and corrosion monitoring. Encoding of electromechanical and electrochemical sensing transduction mechanisms (i.e. strain and pH, respectively) within a thin film structure is accomplished by adopting material fabrication techniques derived from the nanotechnology domain. Nanotechnology provides tools and materials such that, by manipulating material properties at the molecular scale, one can utilize a "bottom-up" design methodology to yield high performance sensors. In particular, single-walled carbon nanotubes (SWNTs) and a variety of polyelectrolyte (PE) species combined with a layer-by-layer (LbL) fabrication technique can produce a homogeneous multilayer thin film sensor of controlled morphology. When coupled with a coil antenna, the final multifunctional sensor package is capable of wirelessly detecting strain and pH via characteristic frequency and bandwidth changes, respectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A and 4B are conceptual illustrations showing how strain affects thin film dimensions that lead to capacitance change, wherein FIG. 4A is an unstrained and FIG. 4B is strained;

DETAILED DESCRIPTION

1. General Matters

Example embodiments will now be described more fully with reference to the accompanying drawings. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

2. RFID Sensing Systems

Among the wide variety of radio frequency identification systems available, the simplest is the passive RFID system which consists of a reader and a remote tag or transponder. The RFID reader is powered by an AC source and is responsible for wirelessly transmitting power and receiving sensor data from the tag, all through inductive coupling. While many commercial and academic RFID tags are coupled with digital electronics (e.g. electronic microchips) for use in a variety of smart card applications, digital electronics need not be used in connection with the present teachings. Any change in sensor response will cause the fundamental properties of the RFID system to change, namely the characteristic frequency and bandwidth of the reader-tag coupling.

2.1. The Reader

Figure 1:
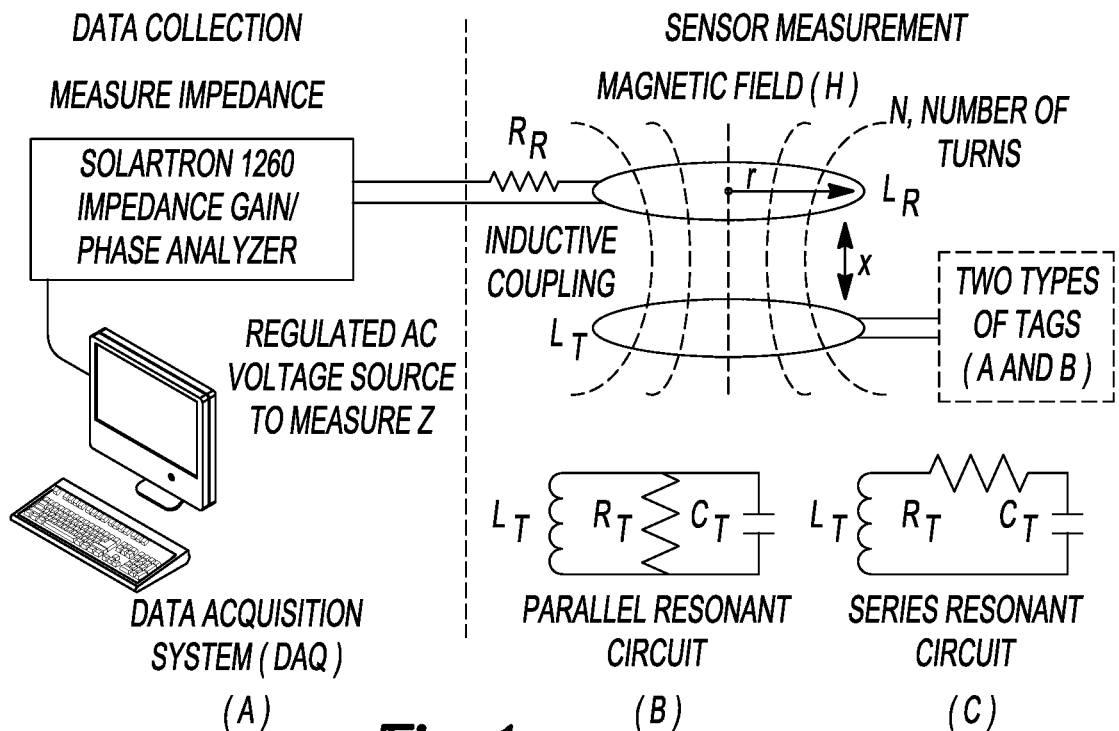
FIG. 1A is a schematic drawing illustrating RFID wireless interrogation of a resonant tag.
FIG. 1B is a circuit drawing of a parallel resonant circuit.
FIG. 1C is a circuit drawing of a series resonant circuit.

In its simplest form, a typical RFID reader consists of a coil antenna connected to an automatic frequency response analyzer (FRA). In some embodiments, the Solartron 1260 impedance gain/phase analyzer is selected for its ease of use and its ability to measure electrical impedance in a frequency range between 100 mHz to 32 MHz (well within the operating frequency range of the present RFID sensor system, as will be discussed later). When measuring the complex-valued impedance, Z (Z=A+jB where A and B are the real and imaginary components of the impedance, respectively), the FRA generates a regulated AC voltage signal that is applied to the reader coil; simultaneously, the FRA measures the corresponding AC current response in the coil as AC frequency, f, is varied. As the AC sinusoidal signal passes through the reader coil antenna, a magnetic field is generated in the vicinity of the reader's coil as can be calculated by Eq. (1) and depicted in FIG. 1 (for a circular reader coil based on Faraday's Law).

$$H = \frac{I \cdot N \cdot r^2}{2\sqrt{(r^2 + x^2)^3}} \quad (1)$$

where I is the current passing through the coil, r is the antenna radius, N is the number of turns, and x is the read-distance along the central axis of the coil (FIG. 1). This resulting magnetic field is employed to induce current and a potential drop in an RFID tag within close proximity. From Eq. (1), it can be observed that a tradeoff exists between different size antennas such that smaller antennas are capable of generating higher fields at the coil axis but larger antennas generate higher magnetic fields over larger distances (x).

2.2. Sensor Tag

Figure 2:
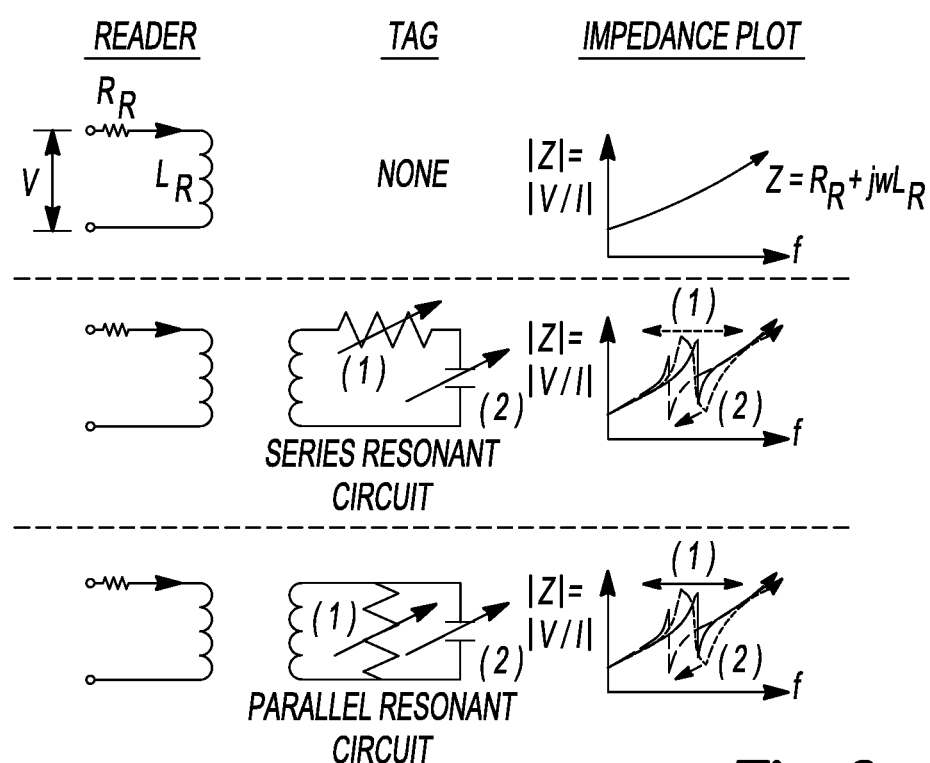
FIG. 2 is a schematic drawing illustrating RFID reader impedance (Z) response when no sensor tag is in the vicinity, when present with a series resonant circuit, or when present with a parallel resonant circuit.

One of the main advantages of radio frequency identification systems is that sensor tags do not require a constant power supply (e.g., batteries or AC power), thereby permitting the design of miniature thin film tags capable of being embedded in structures. Typically, the circuitry of a basic sensor tag consists of a resistor ($R_T$), inductor (coil antenna) ($L_T$), and capacitor ($C_T$) in a parallel or series resonant circuit configuration, also known as an RLC-circuit (FIGS. 1 and 2). Inherent to each parallel or series resonant circuit are two quantities, namely its characteristic (or resonant) frequency ($f_n$) and bandwidth (B). While the characteristic frequency of an RLC-circuit does not change with circuit configuration, bandwidth varies between a parallel and series resonant circuit as shown in Eqs. (2) and (3).

$$f_n = \frac{1}{2\pi\sqrt{L_T C_T}} \quad (2)$$

$$B_{series} = \frac{R_T}{2\pi L_T} \quad (3a)$$

$$B_{parallel} = \frac{1}{2\pi R_T C_T} \quad (3b)$$

Selection of sensor tag circuit configuration depends on whether characteristic frequency shift or bandwidth change is more desirable. Furthermore, certain voltage and current requirements for powering onboard digital electronics governs the type of resonant circuit configuration used. At resonance ($f_n$), series and parallel tags provide maximum current (minimum impedance) or maximum voltage (maximum impedance), respectively.

2.3. Coupled Reader and Tag System

If the Solartron 1260 FRA measures the complex impedance response of the reader coil antenna, the measured impedance would be governed by Eq. (4).

$$Z = R_R + j\omega L_R \quad (4)$$

where $R_R$ is the inherent series resistance of the coil, $L_R$ is the inductance of the reader coil antenna, and ω (rad/sec) is the natural cyclic frequency of the input AC sinusoidal signal (FIG. 2a). However, when a sensor tag comes in the vicinity of the reader coil, an additional complex impedance term (due to inductive coupling, $Z_T'$) is superimposed onto the impedance of the measured coil antenna.

$$Z = R_R + j\omega L_R + Z_T' \quad (5)$$

In order to calculate $Z_T'$, one can begin by calculating the equivalent impedance of each circuit element in the series or parallel sensor tag: namely, the inductor ($Z_L$), resistor ($Z_R$), and capacitor ($Z_C$) impedances:

$$Z_L = R_S + j\omega L_T \quad (6)$$
$$Z_R = R_T$$
$$Z_C = \frac{1}{j\omega C_T}$$

Note, the resistance $R_S$ is the inherent series resistance of the sensor tag's inductive coil. Using the equivalent impedance of each circuit element as given in Eq. (6), the total impedance measured at the reader can be determined. For example, when a series resonant circuit tag comes into close proximity to the RFID reader, the measured impedance can be calculated by Eq. (7).

$$Z = R_R + j\omega L_R + \frac{k^2 \omega^2 L_R L_T}{Z_L + Z_C + Z_R} \quad (7)$$

Similarly, for a parallel resonant circuit:

$$Z = R_R + j\omega L_R + \frac{k^2 \omega^2 L_R L_T}{1/Z_L + 1/Z_C + 1/Z_R} \quad (8)$$

From Eq. (7) and (8), a coupling factor (k, a number between 0 and 1) qualitatively describes the mutual inductance between the reader and sensor coil antennas. Theoretically, k=1 when the reader and tag coil antennas are of the same size, the same inductance, perfectly aligned by their coil axes, and separated by a distance of zero. However, the coupling factor is strongly dependent on coil geometry, operating conditions, range, among other factors. In the event that no sensor tag is present (where the distance between the coils can be approximated by infinity), k=0, and Eq. (7) and (8) reduce back to Eq. (4).

In some embodiments, incorporation of sensors with RFID tag technology is accomplished by using parallel resonant circuit configurations. Using resistive or capacitive sensors, the reader can detect changes in bandwidth or characteristic frequency as shown in FIG. 2. For instance, if a capacitive strain sensor is employed, any increase in capacitance will result in a decrease in resonant frequency that can be modeled using Eq. (2). In this case, while characteristic frequency changes due to strain (changing capacitance), the system bandwidth remains fixed as bandwidth is independent of capacitance (Eq. (3b)). Similarly, an RFID sensor can be designed based on changes in the tag resistor resulting in changes to the reader-tag bandwidth.

3. Layer-by-Layer Sensor Fabrication

Figure 3:
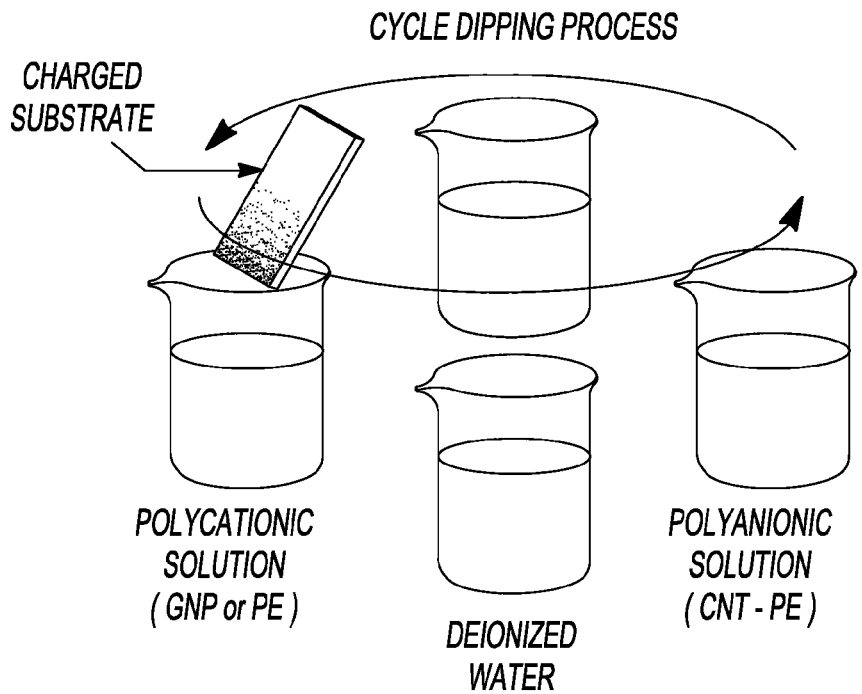
FIG. 3 is a schematic drawing illustrating the layer-by-layer self-assembly process of some embodiments.

Fabrication of multifunctional carbon nanotube-polyelectrolyte composite thin films is accomplished using a layer-by-layer (LbL) self-assembly methodology. Through the sequential dipping of a charged substrate (e.g. glass, silicon, poly(ethylene terephthalate)) in oppositely charged polycationic and polyanionic solutions, different species such as carbon nanotubes, polyelectrolytes, and nanoparticles can be deposited one monolayer at a time (FIG. 3).

In some embodiments, to begin LbL thin film fabrication, a clean glass microscope slide treated with piranha solution (3:7 by vol. H2O2:H2SO4) is dipped into a polycationic solution (1.0 wt. % poly(vinyl alcohol) (PVA, Sigma) or 1.0 wt. % poly(aniline) emeraldine base (PANI, Aldrich)) for 5 min to deposit the initial monolayer. Upon rinsing with 18 MΩ deionized water (Millipore) (3 min) followed by drying with compressed nitrogen (10 min), the slide is then immersed in a polyanionic solution (SWNTs dispersed in 1.0 wt. % poly(sodium 4-styrene sulfonate) (PSS, 1,000,000 Mw, Aldrich)) to deposit the next monolayer. Similarly, after a dipping time of 5 min, the glass slide and the adsorbed monolayer is rinsed in 18 MΩ deionized water for 3 min and dried for 10 min. This process completes the fabrication of one bilayer of the thin film; through repetition of the aforementioned process, the end result is a homogeneous multilayer thin film of controlled morphology denoted as (A/B)n (where A and B represent the oppositely charged species, and n denotes the number of film bilayers).

Figure 16:
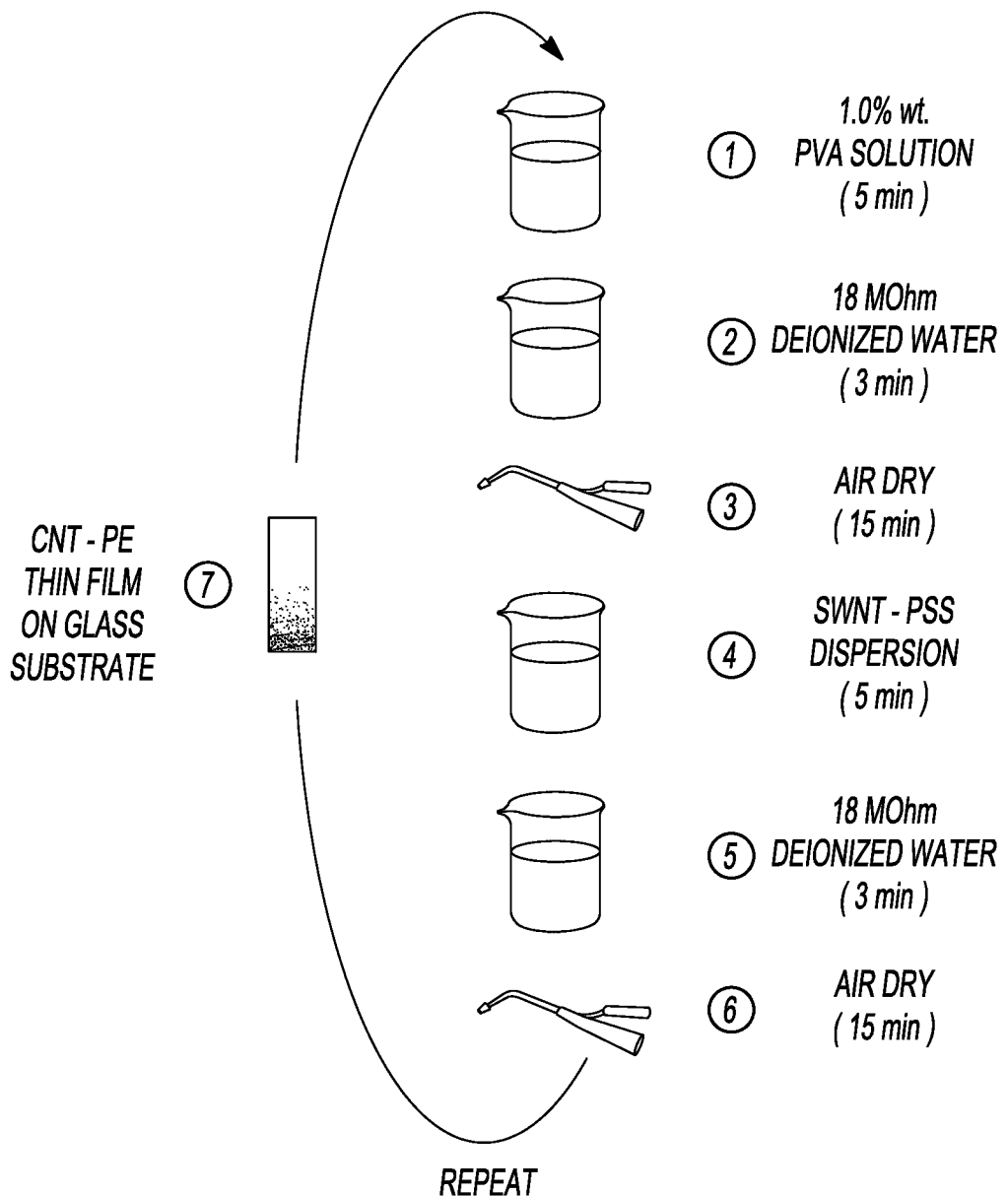
FIG. 16 illustrates the layer-by-layer deposition of one bilayer of a CNT-PE thin film using a self-assembly process.

In some embodiments, homogeneous multiphase carbon nanotube-polyelectrolyte composite thin films are fabricated via a systematic layer-by-layer assembly technique. The LbL method entails the sequential dipping of a charged substrate (i.e. glass, silicon, among others) in oppositely charged polyanion and polycation solutions to deposit a variety of species one monolayer at a time (as depicted in FIG. 16). Selective deposition of each additional monolayer is based on opposite charge electrostatic and van deru Waals force interactions. By controlling fabrication parameters, such as PE, concentration of dipping solutions, and dipping time, thin films of variable compositions can be achieved.

The first monolayer in the LbL assembly process is deposited by dipping a clean, charged glass microscope slide in a positively charged polycation solution (in this case, a PE solution such as poly(vinyl alcohol) (PVA, Sigma) or polyaniline (PANI, Aldrich)) for 5 min. Excessively large particulates and loosely adsorbed PE species are rinsed off in 18 M_deionized water for 3 min, followed by a drying step for 15 min to prevent cross-contamination between the oppositely charged solutions. Using very fast magic-angle spinning nuclear magnetic resonance (MAS NMR), Rodriguez et al has verified that the adsorbed polyelectrolytes remain deposited even after rinsing. The CNT monolayer deposition is achieved by dipping the PE-coated substrate in a stable, negatively charged polyanionic CNT dispersion (CNTs from Carbon Nanotechnologies, Inc.) for 5 min, followed by the rinsing/drying steps described above. Here, a 1.0 wt % aqueous solution of poly(sodium 4-styrene-sulfonate) (PSS, 1 000 000 Mw, Aldrich) is employed to achieve a stable, negatively charged suspension of CNTs. This process completes one full cycle of the LbL assembly to form one bilayer of the CNT-PE thin film. Multilayer thin-film assembly is realized by repeating the aforementioned procedure to fabricate free-standing films of 50 and 100 bilayers of different compositions (table 1).

TABLE 1

Matrix of 20 unique films fabricated.

| | | 0.25 mg ml⁻¹ SWNT | 0.50 mg ml⁻¹ SWNT | 0.80 mg ml⁻¹ SWNT |
|---|---|---|---|---|
| Strain sensing | u-SWNT-PSS/PVA[a] | 50 and 100 bilayers | 50 and 100 bilayers | 50 and 100 bilayers |
| | p-SWNT-PSS/PVA[b] | 50 and 100 bilayers | 50 and 100 bilayers | 50 and 100 bilayers |
| | p-DWNT-PSS/PVA[c] | 50 and 100 bilayers | 50 and 100 bilayers | 50 and 100 bilayers |
| pH sensing | p-SWNT-PSS/PANI[d] | — | — | 50 and 100 bilayers |

[a]Unpurified SWNTs dispersed in 1.0 wt % wt PSS with 1.0 wt % PVA LbL counterpart.
[b]Purified SWNTs dispersed in 1.0 wt % PSS with 1.0 wt % PVA LbL counterpart.
[c]Purified DWNTs dispersed in 1.0 wt % PSS with 1.0 wt % PVA LbL counterpart.
[d]Purified SWNTs dispersed in 1.0 wt % PSS with 1.0 wt % PANI LbL counterpart.

According to the principles of the present teachings, an n-bilayer composite thin film fabricated with oppositely charged species X and Y will be denoted as (X/Y)n. Specifically, three different CNTs are used (unpurified SWNTs (u-SWNTs), purified SWNTs (p-SWNTs), and purified DWNTs (p-DWNTs)). Also, two different PE species, PVA and PANI, are employed in the thinfilm composites for strain and corrosion sensing, respectively.

Figure 17:
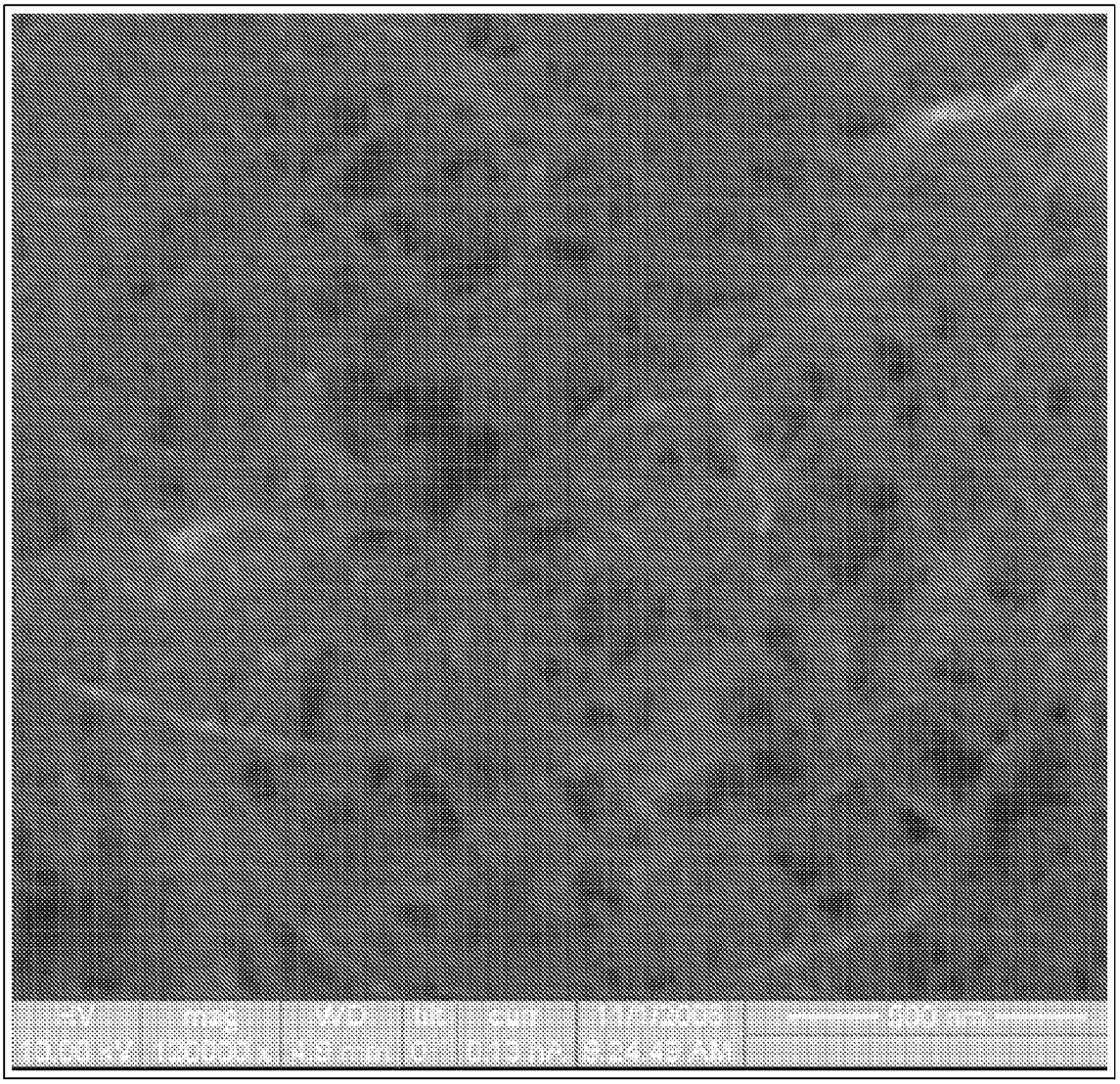
FIG. 17 is an SEM image of (SWNT-PSS/PVA) 50 thin film, indicating adequately dispersed SWNTs deposited on the LbL thin film.

In order to fully harness the impressive electrical properties of CNTs and to transfer these properties to tangible length scales (i.e. LbL thin films), a stable suspension and dispersion of CNTs in an aqueous solution is necessary. Currently, many researchers have undertaken covalent stabilization techniques to molecularly bind specific species to CNT surfaces for enhanced dispersion and functionality; however, a noncovalent approach via steric stabilization of CNTs in polyelectrolyte solutions is selected for this study as this method preserves the mechanical and electrical properties of individual nanotubes. A high-molecular-weight poly(sodium 4-styrene-sulfonate) (Mw ? 1000 000) polyanion solution is employed to facilitate dispersion of single- and double-walled carbon nanotubes. Dispersion is achieved through 180 min in an ultrasonication bath (135 W, 42 kHz) followed by 90 min of high-powered probe sonication (3.178 mm tip, 500 W, 22.0 kHz). Adequate dispersion of CNTs is verified with scanning electron microscopy (SEM), where FIG. 17 shows deposition of only individual and small nanotube bundles with the percolation threshold exceeded. While it has been found in preliminary studies that PSS facilitates dispersion of SWNTs, Moore et al validate a wide variety of polymer dispersive agents for CNTs. A key finding they report is that higher-molecular-weight polymers (e.g. PSS) tend to suspend more SWNTs due to their longer polymeric chains and the size of their hydrophilic groups for enhanced steric stabilization. Nevertheless, a wide variety of polymers and surfactants has been shown to provide adequate dispersion of nanotubes in solution. Preliminary UV-vis studies of CNT-PE thin films fabricated with PSS and PVA indicate greater absorbance than films fabricated with other polyelectrolytes (namely PDMA, PAH, among others). Measured UV-vis absorbance correlates to the amount of CNT deposition, thereby suggesting efficient nanotube deposition per LbL fabrication cycle when using PVA as the LbL electrolyte counterpart to PSS.

As outlined herein, different sensing transduction mechanisms (e.g. strain, pH, temperature, light, among others) can be encoded within LbL thin films through the judicious selection of polyelectrolyte species. In some embodiments, single-walled carbon nanotubes (0.8 mg/mL) dispersed in 1.0 wt. % PSS is employed as the polyanionic solution for LbL thin film fabrication. Similar to Loh, et al. (2007b), steric stabilization of nanotubes in PSS can be achieved by subjecting the SWNT-PSS solution to 90 min of an ultrasonic bath (135 W, 42 kHz) followed by 90 min of high-powered probe sonication (3.178 mm tip, 30% amplitude, 750 W, 22.0 kHz). For the polycationic solution, two different polyelectrolytes, namely PVA deposited on PET substrates and PANI deposited on glass substrates, are employed to yield capacitive strain sensors and resistive pH sensors, respectively. Table 2 outlines the LbL constituents required for fabricating SWNT-PE strain and pH sensors.

coils constructed from 28 AWG magnetic coil wire. Preliminary work in depositing inductive coil antennas directly in the LbL process is presented.

4.1. Wireless Strain Sensing (SWNT-PSS/PVA)n thin films have been demonstrated to exhibit piezoresistive response under applied tensile-compressive strains ($\in=+10,000$ μm/m). Despite their ability to precisely tailor strain sensor sensitivity by adjusting initial fabrication parameters, the strain sensor response exhibits a time-dependent exponential decay in film resistance. It is believed that applied electrical current (used for measuring resistance) induces permanent chemical and physical changes at nanotube-to-nanotube junctions, thereby increasing film conductivity over time. To avoid gradual conductive changes to interfere with the sensor reading, an alternative approach is taken. The conductive carbon nanotube thin film is deposited by LbL on a soft polymeric substrate. The thin film and substrate, under applied strain, will exhibit a change in capacitance directly correlated to strain.

Figure 4:
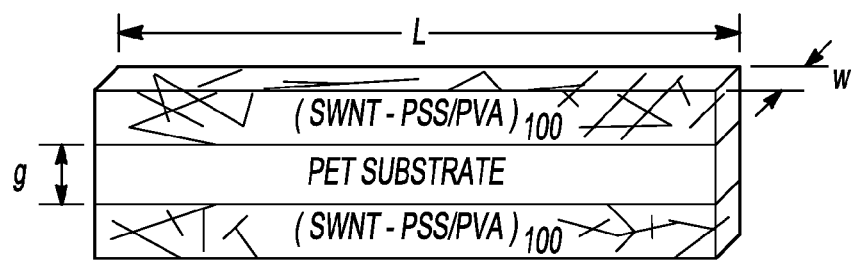
Figure 4:
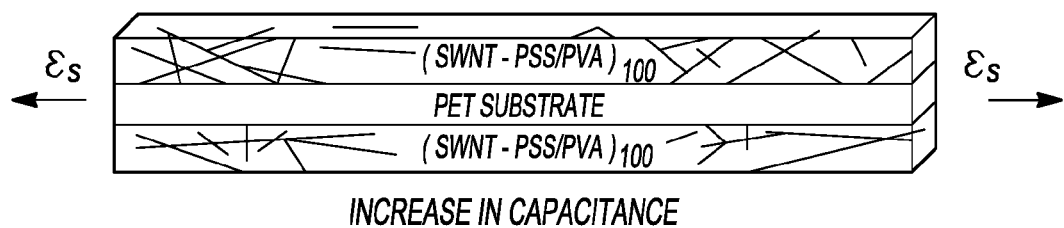

The design of an LbL SWNT-based capacitive strain sensor is accomplished using a charged PET substrate (0.127 mm thick). By depositing (SWNT-PSS/PVA)$_{100}$ thin films on both sides of this flexible PET thin film, an SWNT-based parallel-plate capacitive strain sensor can be formed as depicted in FIG. 4 (denoted as SWNT-on-PET). PET is selected as the dielectric layer due to its high Poisson's ratio (ca 0.4) and ductility. Thus, the capacitance of the SWNT-on-PET strain sensor under applied strain can be calculated via Eq. (9).

$$C_{SWNP\text{-}on\text{-}PET} = \frac{\varepsilon_r \varepsilon_0 w L}{g}(1+\varepsilon_s) \quad (9)$$

where $\in r$ is the relative dielectric permittivity of PET, $\in 0$ is the permittivity of air ($\in 0 = 8.854 \cdot 10 - 12$ F/m), w (width) and L (length) are the dimensions of the parallel-plate capacitor, g is the initial thickness of the PET thin film substrate (0.127 mm), and $\in$s is the applied strain. From Eq. (9), it can be seen that capacitance is linearly proportional to applied strain. Furthermore, sensor capacitance can be precisely tuned by controlling sensor dimensions (w, L, and g). Upon coupling

TABLE 2

Summary Of Layer-By-Layer Thin Film Sensor Constituents

| Sensor Type | Mechanism | Substrate | Polycationic specie | Polyanionic specie |
|---|---|---|---|---|
| Strain sensing | Capacitive | Poly(ethylene terephthalate) | 1.0 wt. % Poly(vinyl alcohol) | 1.0 mg/ml SWNT in 1.0 wt. % Poly (sodium 4-styrene sulfonate) |
| pH sensing | Resistive | Glass (SiO$_2$) | 1.0 mg/mL Poly(aniline) (emeraldine base) in 10 vol. % N,N-dimethyl formamide | 1.0 mg/ml SWNT in 1.0 wt. % Poly(sodium 4-styrene sulfonate) |

4. Experimental Results and Discussion

Provided the extreme versatility of LbL-fabricated carbon nanotube composite thin films, the films are employed as integral elements of passive wireless sensors based on RFID technology. Two sensors are specifically provided: strain and pH sensors. A carbon nanotube composite film is deposited on a soft substrate to act as the variable capacitor (sensitive to strain) of a parallel RFID sensor tag. Second, a PANI-based thin film is employed as a variable resistor (sensitive to pH) in an RFID tag. Both sensors can employ traditional inductive this capacitive strain sensor with a parallel resonant tag circuit (where L≈235 pH and R≈1.2 MΩ), any applied strain will result to an inversely proportional shift in resonant frequency as given in Eq. (2). The inductive tag element is assembled by a wire coil approximately 45 mm in radius and 50 turns.

Figure 5:
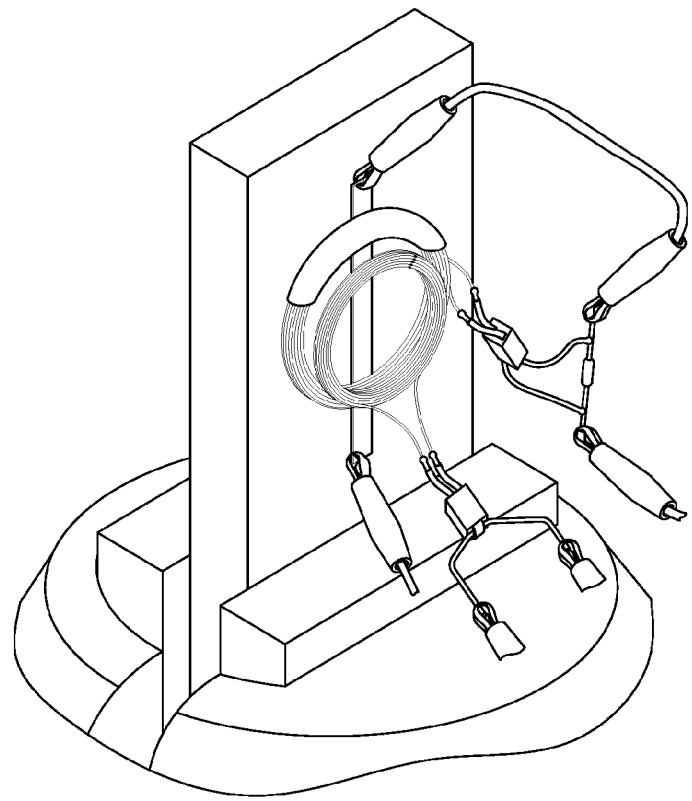
FIG. 5 is a photograph of a SWNT-on-PET capacitive strain sensor (epoxy-bonded to a PVC bar) in a parallel resonant circuit configuration loaded by a MTS-810 load frame.

Validation of this wireless strain sensor is conducted by applying one cycle of a tensile-compressive load pattern ($\in=\pm10,000$ μm/m) while wirelessly measuring its response using the Solartron 1260 impedance gain/phase analyzer coupled with a coil antenna to form the RFID reader. Prior to mechanical loading, the wireless strain sensor is mounted to a poly(vinyl chloride) (PVC Type I) rectangular tensile coupon (31 cm long, 4 cm wide, 2 cm thick) via standard CN-E strain gauge epoxy (available from Tokyo Sokki Kenkyujo) as shown in FIG. 5. Upon sufficient drying (6 hours), an MTS-810 load frame is employed to apply the one-cycle tensile-compressive load pattern at 2,500 μm/m strain increments. At each strain increment, the load frame is held at constant displacement and load (for approximately 5 min) to allow the RFID reader to wirelessly interrogate the strain sensor tag. The distance between the reader and tag coils is approximately 3 cm.

Figure 6:
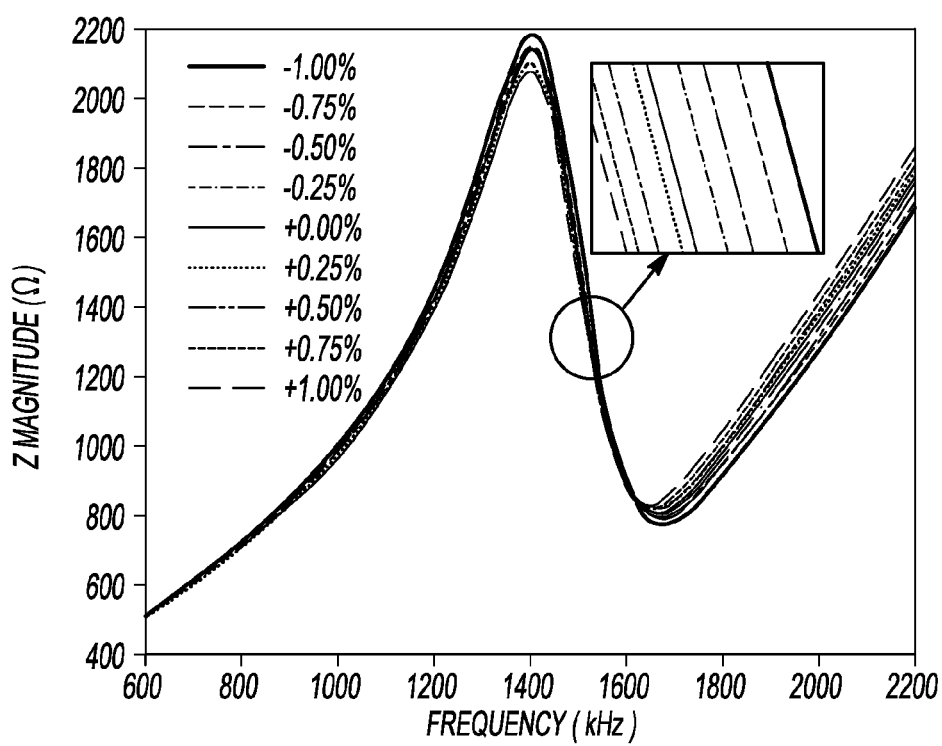
FIG. 6 is a graph illustrating an experimental RFID reader response of SWNT-on-PET capacitive strain sensor under one-cycle tensile-compressive cyclic loading to ±10,000 μm/m (inset shows zoomed in plot near the resonant frequency)
Figure 7A:
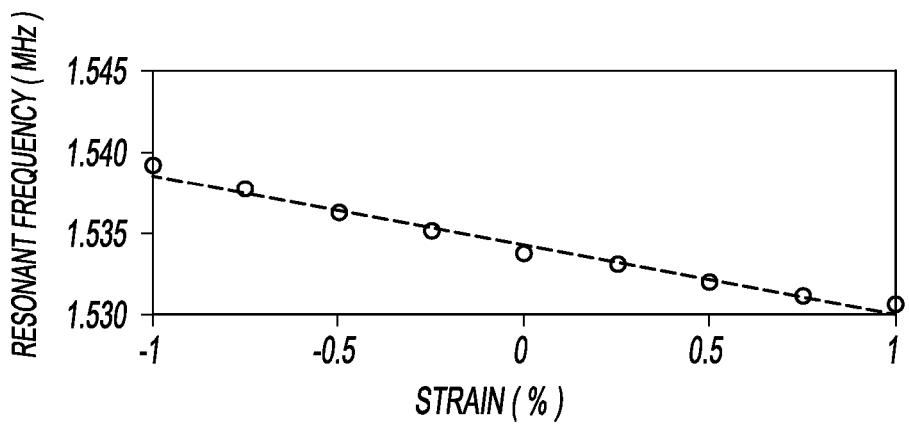
FIG. 7A is a graph illustrating a resonant frequency shift of SWNT-on-PET capacitive strain sensor under one-cycle tensile-compressive cyclic loading to ±10,000 μm/m.

FIG. 6 represents a typical experimental data plot of the wireless strain sensor's coupled impedance as collected by the RFID reader. Identification of sensor characteristic frequency can be accomplished by observing a dip in the phase angle or the inflection point in the impedance magnitude-frequency plot. FIG. 7a plots the calculated resonant frequency as a function of applied strain. From substituting Eq. (9) into Eq. (2) to yield Eq. (10), it is apparent that resonant frequency shift is nonlinearly related to applied strain (i.e. by a $1/\sqrt{(1+\epsilon s)}$ relationship).

$$f_n = \frac{1}{2\pi\sqrt{L_T \varepsilon_r \varepsilon_0 wL(1+\varepsilon_s)/g}} \tag{10}$$

Figure 7B:
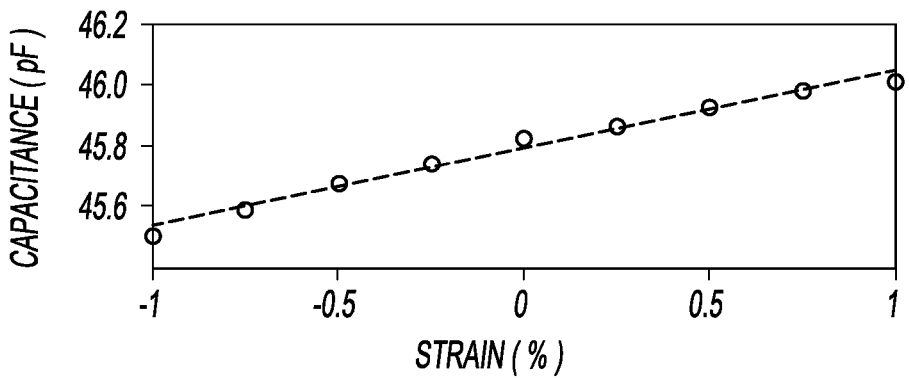
FIG. 7B is a graph illustrating a corresponding SWNT-on-PET capacitance change relating to FIG. 7A.

Nevertheless, since the degree of nonlinearity is small, strain sensor sensitivity (SC) can be approximated by fitting a linear least-squares best-fit line to FIG. 7a to yield SC=0.427 Hz/μm-m−1. It should be noted that because the differential frequency step during impedance measurement is small (Δf=1 kHz), linear interpolation is employed between data points to extract sensor resonant frequency at each applied strain increment. Furthermore, upon determining sensor characteristic frequency, capacitance is back-calculated using Eq. (2) and plotted in FIG. 7b. Apparent in FIG. 7b, capacitance does indeed increase linearly in tandem with applied strain.

4.2. Wireless pH Sensing

Figure 8:
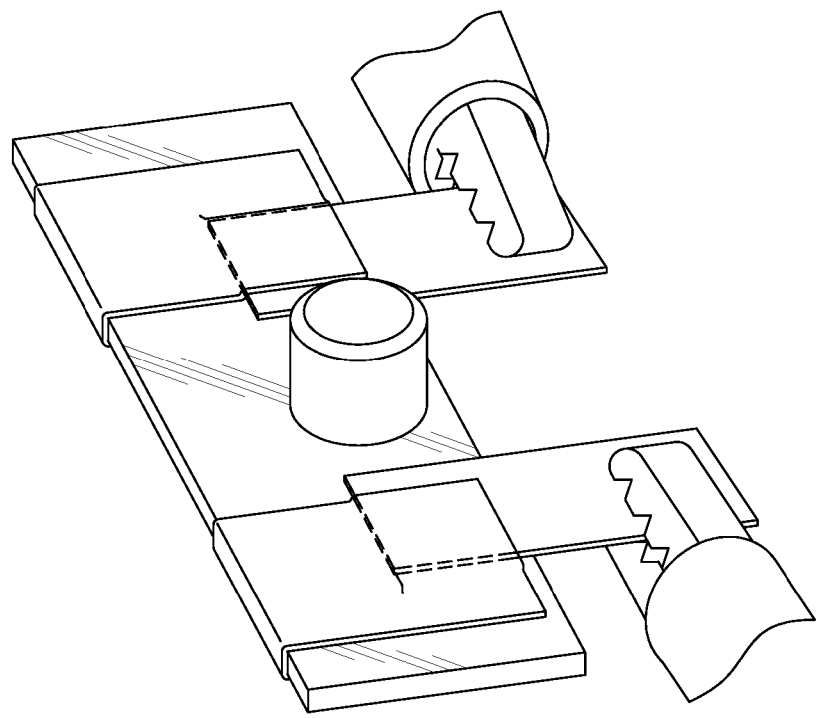
FIG. 8 is a photograph illustrating a (SWNT-PSS/PANI)$_{50}$ thin film with plastic well mounted for pipetting pH buffer solutions.

In some embodiments, as opposed to using a capacitive-based sensor for monitoring strain, a resistive thin film pH sensor is employed for wireless pH sensing. As outlined in Section 3 of the present disclosure, LbL (SWNT-PSS/PANI)$_n$ thin films exhibit pH sensitivity. To characterize (SWNT-PSS/PANI)$_n$ thin film pH sensing performance, an initial study to measure change in film resistance under a wide range of pH buffer solutions (pH 1-10) is conducted. Using (SWNT-PSS/PANI)$_{50}$ thin films still attached to their original glass substrate, these films are cut with a diamond-tipped scriber into small rectangular specimens (7 mm by 11 mm). A plastic well is attached to the center of the film surface via high-vacuum grease (Dow Corning), thereby allowing different pH buffer solutions to be pipetted into this plastic well. Finally, electrical connections are established by drying colloidal silver paste (Ted Pella) over single-strand wire at the two ends of the thin film as shown in FIG. 8.

Figure 9A:
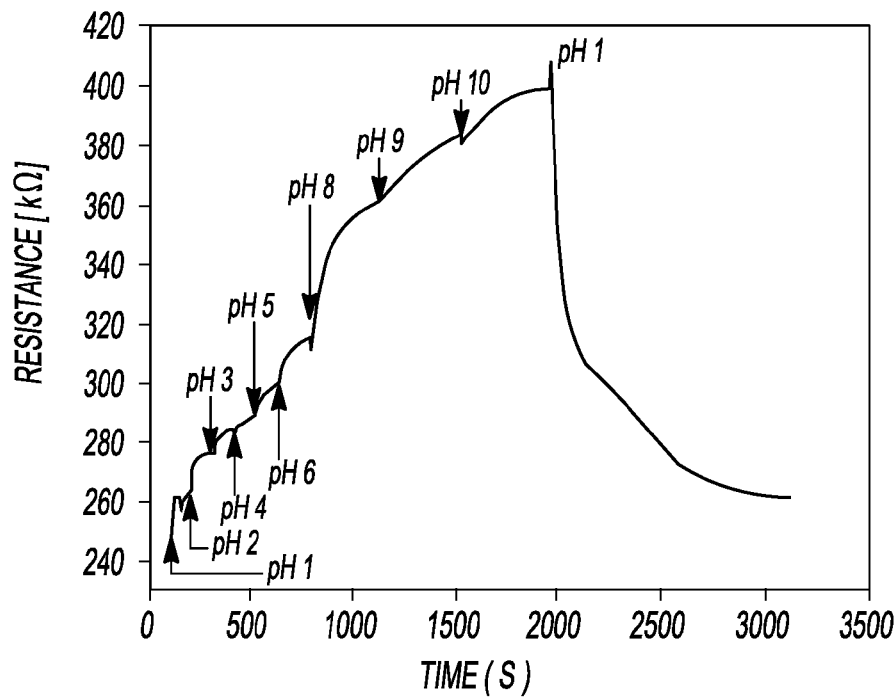
FIG. 9A is a graph illustrating the time history plot of (SWNT-PSS/PANI)$_{50}$ thin film resistance due to different pH buffer solutions
Figure 9B:
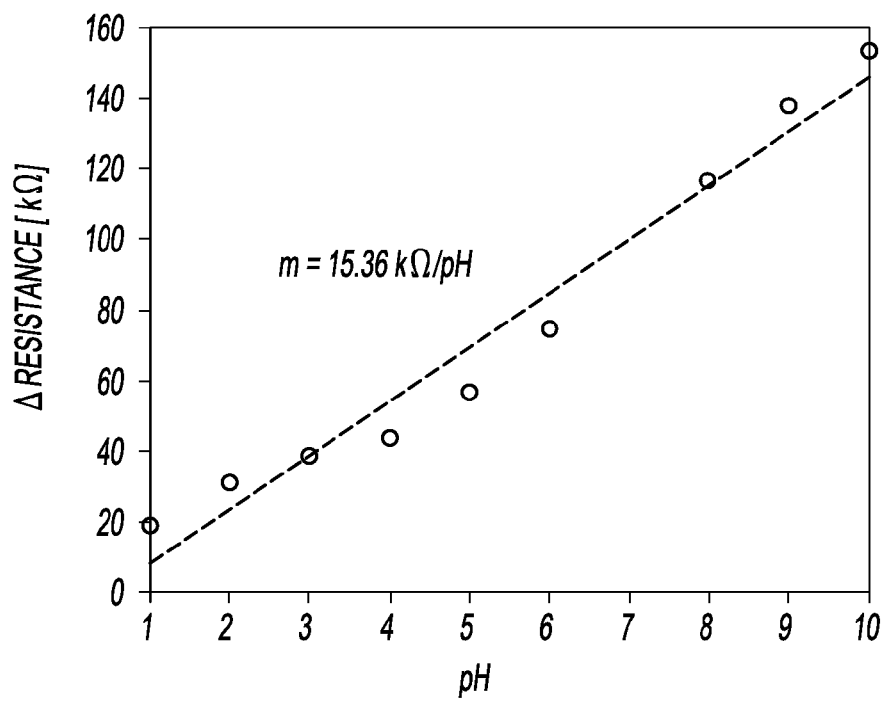
FIG. 9B is a linearity plot depicting the change of resistance as a function of applied pH buffer solution indicating pH sensing sensitivity is 15.36 kΩ/pH.

Characterization of (SWNT-PSS/PANI)$_{50}$ thin film pH sensor performance begins by pipetting increasing pH buffer solutions while measuring film resistance with an Agilent 34401A digital multimeter connected in a two-point probe fashion. While a two-point probe method is subjective to contact resistance issues, contact resistance is negligible since typical film resistance is on the order of 101 to 103 kΩ. FIG. 9a plots the (SWNT-PSS/PANI)$_{50}$ thin film resistance time history when subjected to incremental pH buffer solutions (where ΔpH=1). It can be observed that the pH sensor exhibits dramatic increases in resistance in tandem with increasing pH. By plotting the change in film resistance as a function of pH buffer solution, it can be concluded that the pH response is near-linear (FIG. 9b). In addition, by fitting a linear least-squares best-fit line, pH sensitivity (SpH) can be calculated using Eq. (11) (equivalent to the slope of the best-fit line).

$$S_{pH} = \frac{\Delta R/A}{\Delta \text{pH}} \tag{11}$$

where A is the area of the thin film for normalization purposes. For this particular thin film, pH sensitivity is approximately 19.9 kΩ-cm-2/pH, with can be confirmed with conventional techniques. Furthermore, from FIG. 9a, it is apparent that the (SWNT-PSS/PANI)$_{50}$ pH sensor is fully reversible; upon pipetting a pH 10 solution, the addition of a pH 1 solution will renormalize thin film nominal resistance.

Since nominal film resistance is high (101 to 103 kΩ), (SWNT-PSS/PANI)$_{50}$ thin films are coupled with a parallel resonant circuit consisting of a 2,100 μH inductive coil antenna and a 220 pF tuning capacitor to achieve wireless pH sensing. Here, the inductive coil is a 80 mm radius coil consisting of 90 turns. This circuit configuration will cause a change in system bandwidth due to different pH buffer solutions inducing a change in film resistance (from Eq. (3b)). Similar to the aforementioned wireless strain sensor, the resulting pH sensor response is nonlinear, exhibiting a 1/RT relationship between bandwidth and film resistance.

For wireless sensor interrogation, the Solartron 1260 impedance gain/phase analyzer connected to an inductive coil antenna is employed as the RFID reader. Again, pH buffer solutions (pH 1-10) are individually pipetted into the plastic well (FIG. 8). Upon the addition of a pH buffer solution, the RFID reader is employed to measure the complex impedance over a range of frequencies. Once the RFID reader completes interrogating the pH sensor tag, the pH buffer solution in the plastic well is removed, and immediately, a different pH buffer solution is pipetted in. A representative experimental overlay is shown in FIG. 10.

Figure 10:
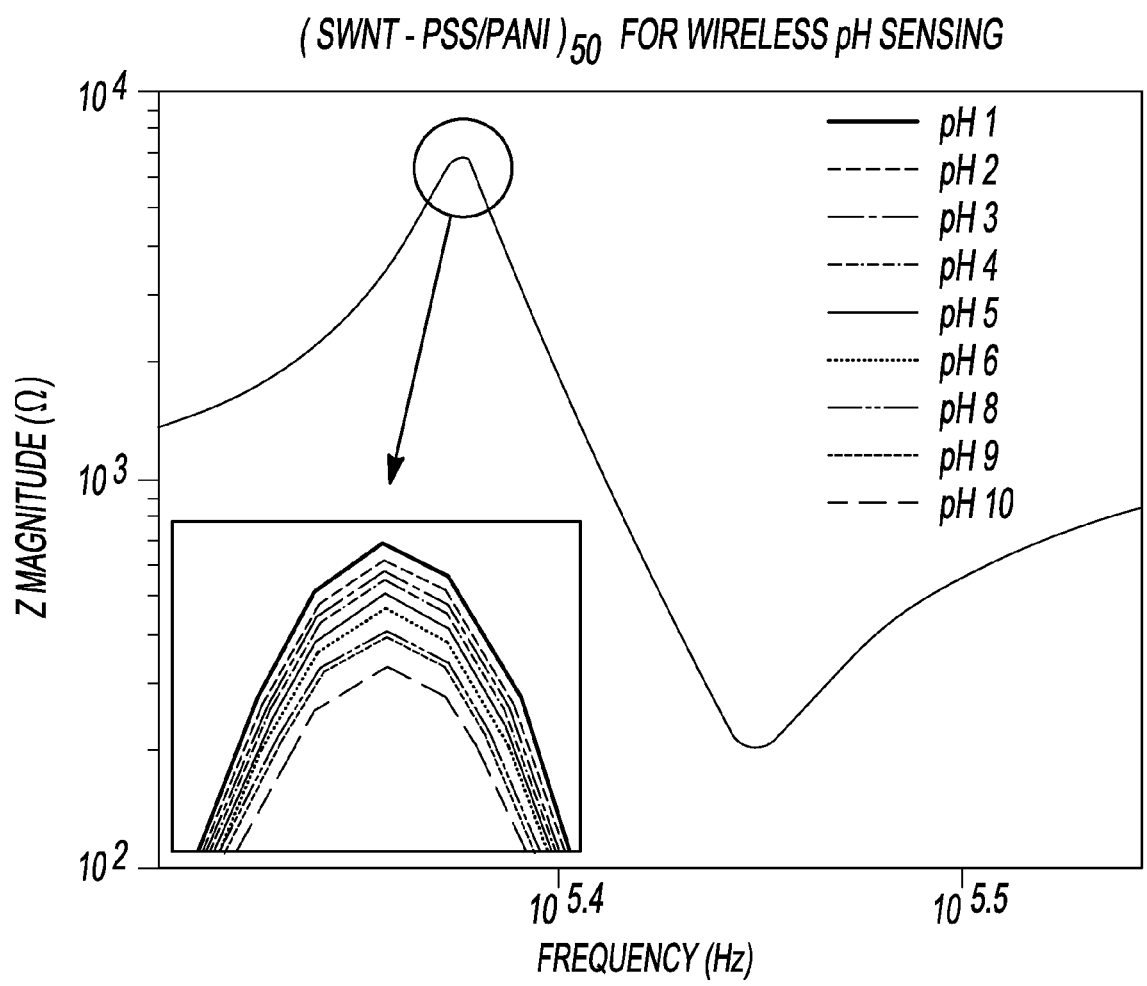
FIG. 10 is an impedance magnitude-frequency response as measured by the Solartron 1260 reader to capture the wireless pH sensor performance with different pH buffer solutions.
Figure 11:
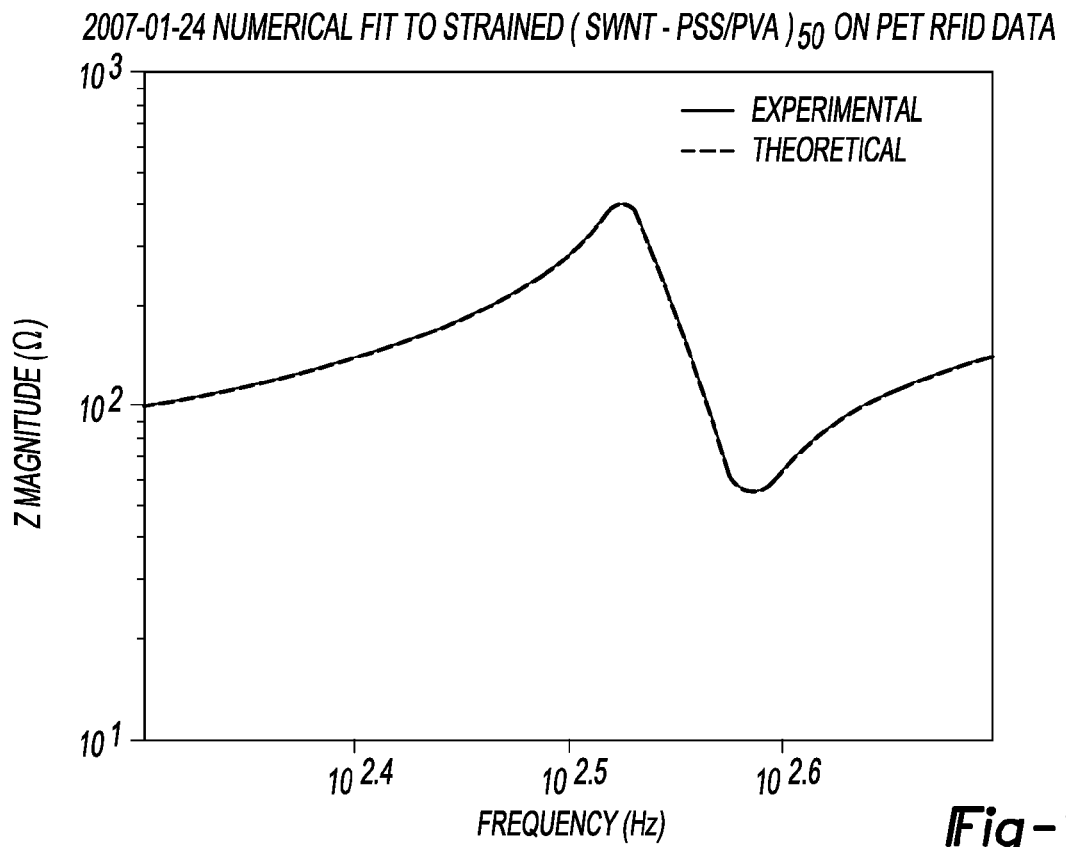
FIG. 11 is a graph illustrating the stochastic simulated annealing model-fitting between theoretical and experimental RFID reader response confirming a valid fit.
Figure 12:
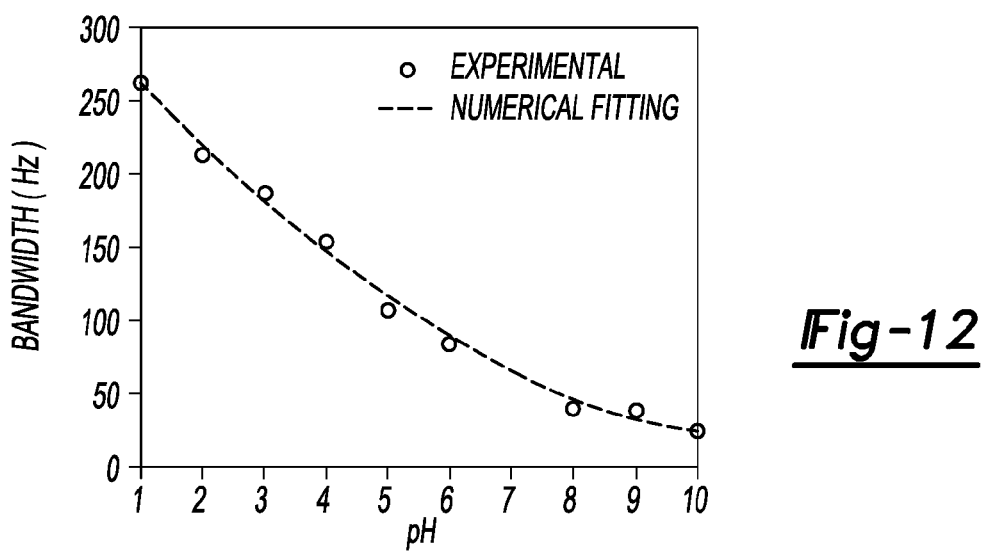
FIG. 12 is a graph illustrating a (SWNT-PSS/PANI)$_{50}$ thin film parallel resonant circuit showing considerable bandwidth change due to applied pH buffer solution.

The inset of FIG. 10, which shows an enlarged portion of the experimental impedance magnitude-frequency overlay, indicates that system bandwidth decreases with increasing pH buffer solutions. However, bandwidth is inherently difficult to quantify; although one can subjectively select frequency limits and calculate bandwidth, this method does not correlate with theory as given in Eq. (3b). In order to accurately calculate system bandwidth from experimental data, a stochastic simulated annealing model-updating algorithm is employed to numerically fit experimental data to theory (Eq. (8)). The model-updating algorithm updates individual circuit elements for both the tag and reader. A typical model-fitting is shown in FIG. 11 for one set of experimental data; it can be observed that the stochastic simulated annealing algorithm can identify tag and sensor equivalent circuit parameters to achieve accurate numerical fitting. Upon determining the resistance, capacitance, and inductance of the sensor tag under different pH buffer solutions, one can then calculate, using Eq. (3b), the change in bandwidth of the system, where the results are plotted in FIG. 12. From FIG. 12, it is apparent that the bandwidth of the wireless pH sensor changes from 270 to 25 Hz as pH increases from 1 to 10.

4.3. Patterning of Coil Antennas in SWNT-based Thin Film Sensors

In some embodiments, highly conductive thin films can be fabricated using the layer-by-layer self-assembly method. While carbon nanotubes exhibit near-ballistic transport-type electronic behavior, the deposition of other polyelectrolyte species during LbL greatly reduces bulk film conductivity, through the incorporation of metallic nanoparticles (e.g. gold) within a polymer matrix. LbL films have been successfully fabricated with bulk metal conductivity. Through the addition of carbon nanotubes and a variety of polyelectrolyte species, it is believed that conductive coil antennas with embedded sensing transduction mechanisms can be achieved in a single LbL assembly process.

Fabrication of carbon nanotube-gold nanoparticle LbL thin films begins by preparing a new set of polycationic and polyanionic solutions. First, by dissolving 1.0 mg/mL of HAuCl4 (Alfa Aesar) in a 1.0 wt. % PVA polycationic solution, gold nanoparticles are formed upon reducing HAuCl4 with 0.1 M sodium borohydride (NaBH4) solution (similar to the procedure reported by Zhang, et al., 2006). Upon vigorous stirring for 10 min, a pink solution is formed, indicating the completion of preparing the polycationic gold nanoparticle solution (denoted as GNP-PVA). As opposed to using PSS for surfactant steric stabilization of SWNTs, sodium dodecyl sulfate (SDS, Mw≈288.38, Sigma-Aldrich) is employed for its smaller molecular size and high nanotube deposition density during LbL. Furthermore, preparation of SWNT-SDS dispersed suspensions only require the use of 180 min of ultrasonication bath (no need for using the high-energy probe sonicator), thereby preserving the mechanical and electrical properties of these carbon nanotubes.

Figure 13:
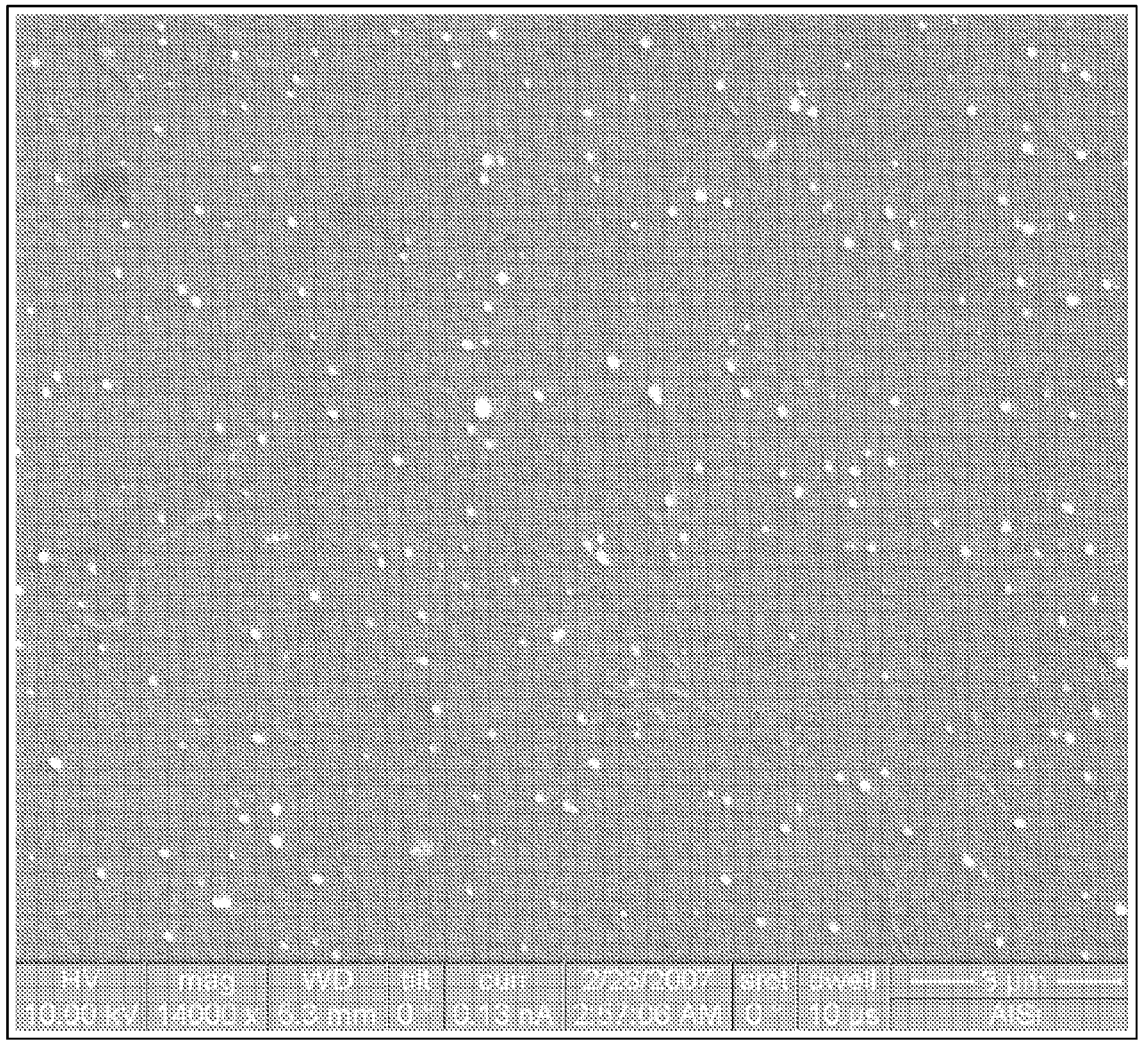
FIG. 13 is a scanning electron microscope (SEM) image of an (SWNT-SDS/GNP-PVA)$_2$ thin film showing the deposition of both SWNTs and GNPs (bright dots)
Figure 14:
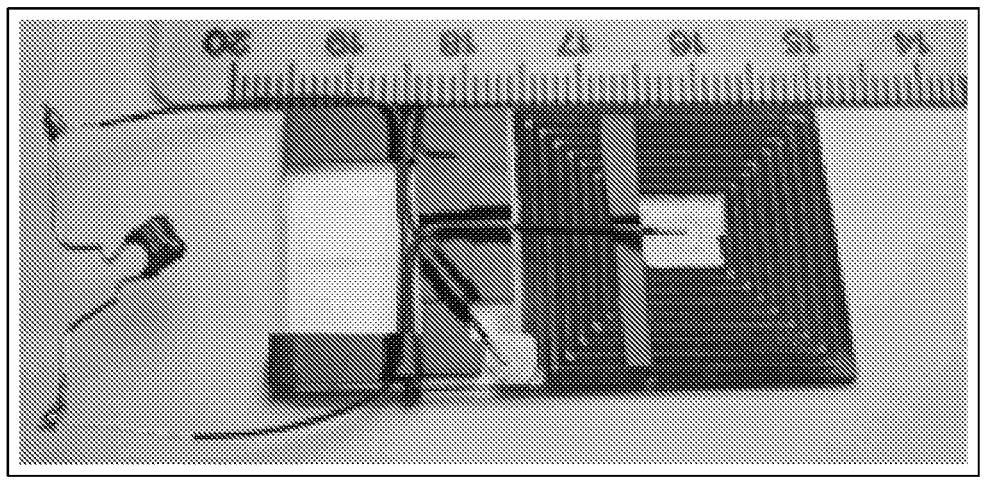
FIG. 14 is a photograph of a patterned (SWNT-SDS/GNP-PVA)$_{50}$ thin film coil antenna connected to a 0.1 μF capacitor to form a series resonant circuit.

Once the polycationic GNP-PVA and polyanionic SWNT-SDS solutions are prepared, the LbL method continues by sequentially dipping a charged glass substrate in these solutions (as described in Section 3). The SEM image of an (SWNT-SDS/GNP-PVA)$_2$ thin film is presented as evidence for the successful deposition of both carbon nanotubes and gold nanoparticles even only after two LbL bilayers (FIG. 13). Upon film fabrication, these (SWNT-SDS/GNP-PVA)$_{50}$ thin films are patterned into conductive coil antennas via high-precision mechanical cutting as shown in FIG. 14. In fact, preliminary two-point resistance measurements of these (SWNT-SDS/GNP-PVA)$_{50}$ thin film coil antennas suggest 4 to 5 times lower resistance than the aforementioned strain and pH thin film sensors (Loh, et al., 2007b). Although film conductivity is greatly enhanced through the incorporation of GNPs and the SDS surfactant for nanotube dispersion and deposition, the coil antenna remains limited by a moderate resistance. After connecting the (SWNT-SDS/GNP-PVA)$_{50}$ coil antenna in series with a 0.1 µF capacitor to form a series resonant circuit (FIG. 14), the bandwidth of this system still remains too high for any potential wireless communications (as governed by Eq. (3a)).

Figure 15:
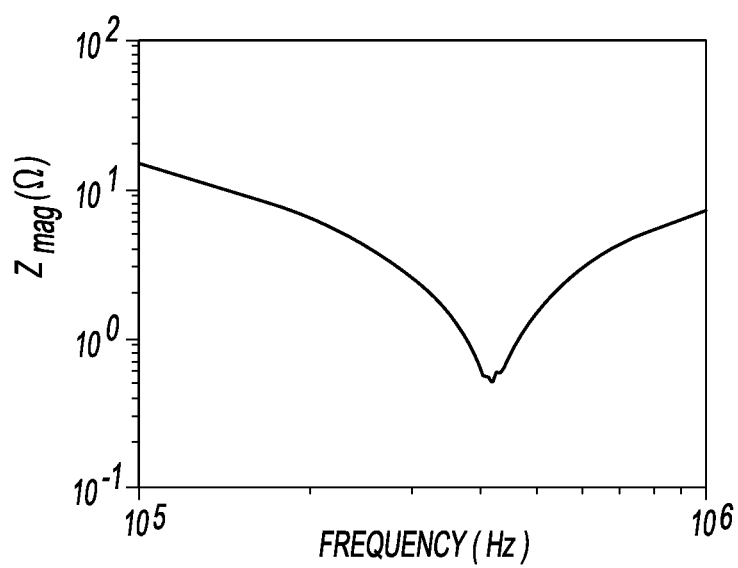
FIG. 15 is a graph illustrating an RFID reader response collected from (SWNT-SDS/GNP-PVA) thin film coil antenna coupled with a 0.1 μF capacitor.

Nevertheless, to validate that the patterned coil antenna indeed does behave as an inductor, the series resonant circuit of FIG. 14 is connected to the Solartron 1260 impedance gain/phase analyzer to measure its complex impedance over a range of frequencies. From Eq. (6), one can then deduce the equivalent complex impedance of a series resonant circuit (which is simply the summation of the impedances of the inductor, its series resistance, and the capacitor) as given in Eq. (12).

$$Z=Z_L+Z_R+Z_C \quad (12)$$

where $Z_L$, $Z_R$, and $Z_C$ is given in Eq. (6). From Eq. (12) and FIG. 15, it is apparent that resonance will occur when a dip is observed in the impedance magnitude-frequency Bode plot. For the aforementioned series resonant circuit, the resonant frequency is identified as approximately 417 kHz.

As evident from the SEM image of FIG. 13, the deposition of GNPs is sparse throughout the film surface. It is anticipated that by synthesizing smaller-sized GNPs with diameters between 2 to 25 nm using thiocyanate or sodium citrate, dense GNP deposition (up to 1800 nanoparticles per µm2) can be achieved resulting in films characterized by higher conductivity. Alternatively, MEMS processes can be employed to sputter thin copper coils on the LbL substrates to form a wireless antenna upon which thin films can be adsorbed.

5. Conclusions

In some embodiments, a layer-by-layer self-assembly technique is employed to fabricate carbon nanotube-based thin film passive wireless strain and pH sensors. It has been demonstrated that by selecting different polyelectrolyte species used during thin film assembly, different sensing mechanisms can be encoded within each thin film. First, by depositing SWNTs dispersed in PSS and PVA onto a conformable PET substrate, a capacitive strain sensor is produced. When coupled to a 28 AWG magnetic wire coil antenna and strained to ±10,000 µm/m, the passive wireless sensor can be wirelessly interrogated while exhibiting decreasing resonant frequency with increasingly applied strain. The overall sensitivity of the prototype passive wireless strain sensor is approximately 0.427 Hz/µm-m−1. On the other hand, wireless pH sensing is accomplished with thin films consisting of SWNTs dispersed in PSS and PANI. As different solutions are pipetted into a plastic well mounted above the film surface, the resistive thin film sensor coupled to a parallel resonant circuit exhibits bandwidth change from 270 to 25 Hz as pH scales from 1 to 10. Since the strain and pH sensing mechanism is different (characteristic frequency and bandwidth change, respectively), these sensors can be coupled within one parallel resonant circuit to yield a multifunctional passive wireless sensor.

According to the present teachings, as opposed to just using carbon nanotubes during film fabrication, gold nanoparticles have been successfully integrated with LbL thin films to show a 4 to 5 fold increase in bulk film conductivity. However, inductive coupling between the reader and tag requires further increases in film (LbL coil antenna) conductivity. Different methods for synthesizing smaller-sized GNPs (2 to 25 nm) can be employed to assist the dense deposition of GNPs during LbL. Nevertheless, the current patterned thin film (SWNT-SDS/GNP-PVA)$_{50}$ antenna coupled to a 0.1 µF capacitor does exhibit series resonant circuit behavior, thereby showing great promise for potential wireless communications with LbL assembled thin film sensors.

6. Sensor Fabrication

6.1. Coil Antenna and Substrate Fabrication

Figure 18:
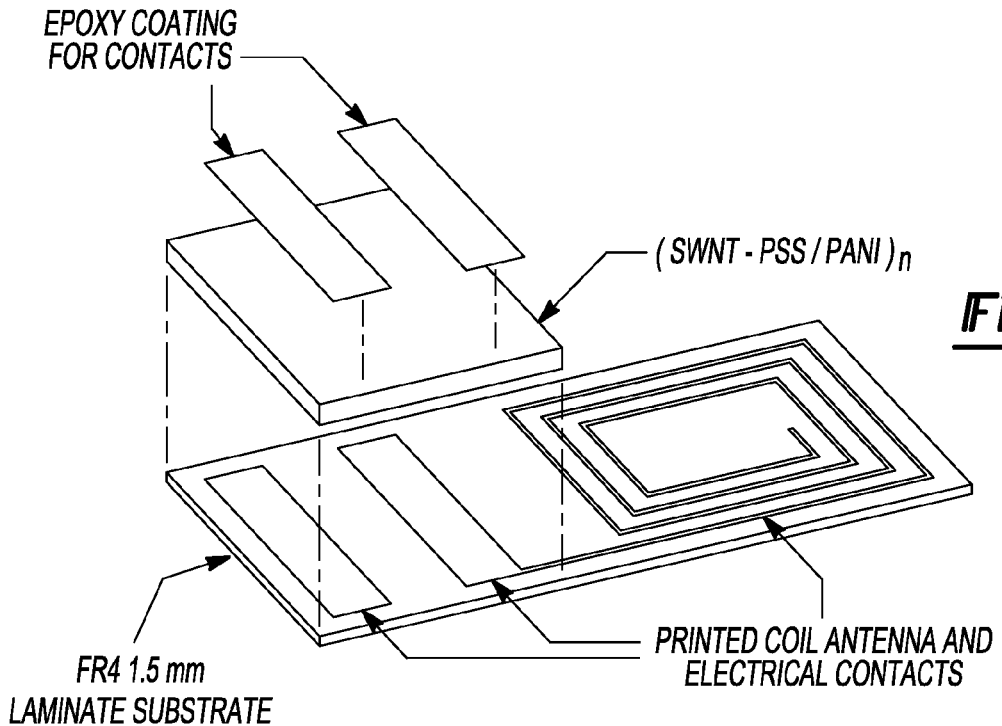
FIG. 18 is a perspective view of a multilayered approach to the deposition of nanocomposite upon a RFID printed circuit.

In order to take full advantage of RFID small form factors, printed circuit board technologies are employed to electroplate and pattern conductive (63/37 fused tin-lead over copper) coil antennas onto 1.5 mm thick FR4 laminates (by AP Circuits, Inc.). Here, a five-turn square coil antenna with a maximum outer dimension of 23 mm and a coil trace width of 0.4 mm is designed to realize a 2.6 pH inductor. These PCB coil antennas can then be coupled with a nanocomposite pH sensor (as the tag resistor) and a 1,000 pF or 1,500 pF leaded ceramic capacitor to achieve a desired tag resonant frequency of 3.0 or 2.5 MHz, respectively (as calculated from Equation 1) (FIG. 18). In addition, a thin epoxy coating is applied over regions where the film is deposited onto PCB electrical contacts. In some embodiments, the antenna can be operably coupled to the sensing assembly such that the antenna is disposed on a substrate and is separate from the sensing assembly.

6.2. Layer-by-Layer Nanocomposite Assembly

Figure 19:
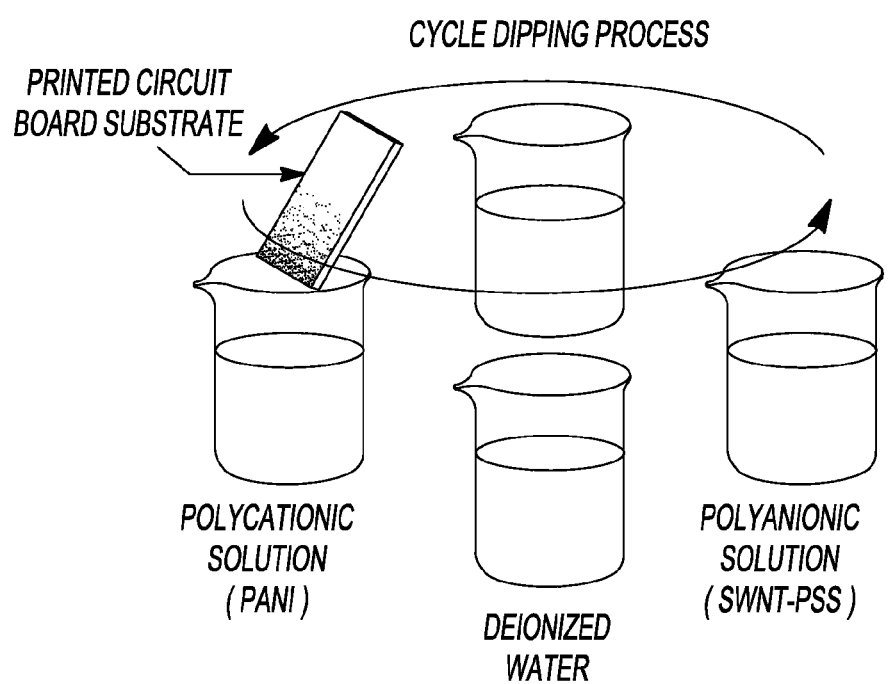
FIG. 19 is a schematic drawing illustrating the layer-by-layer self-assembly process of some embodiments.
Figure 20A:
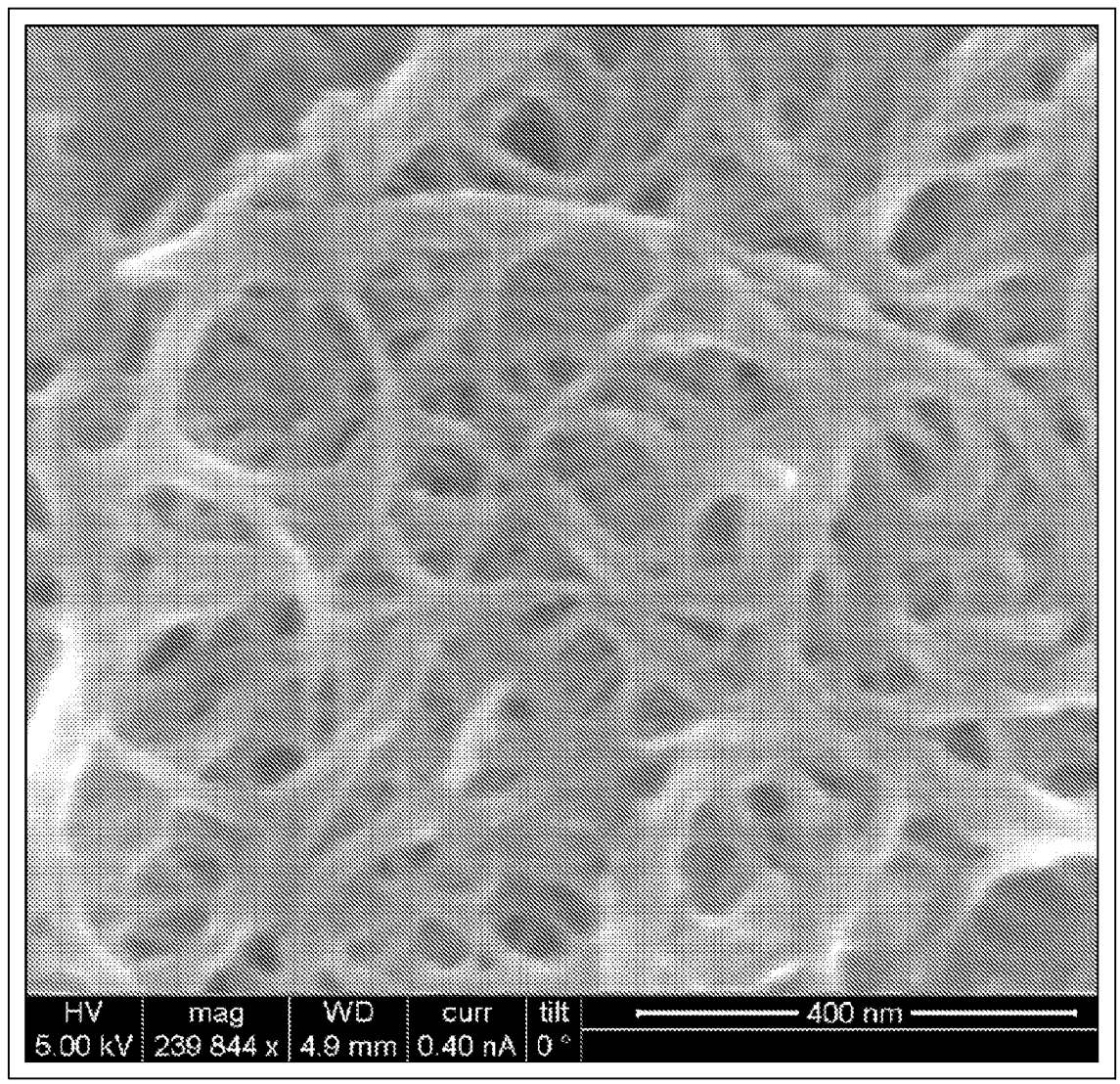
FIG. 20A is an SEM image of the deposition of dispersed carbon nanotube within nanocomposites imaged at moderate (240,000 times) magnification.
Figure 20B:
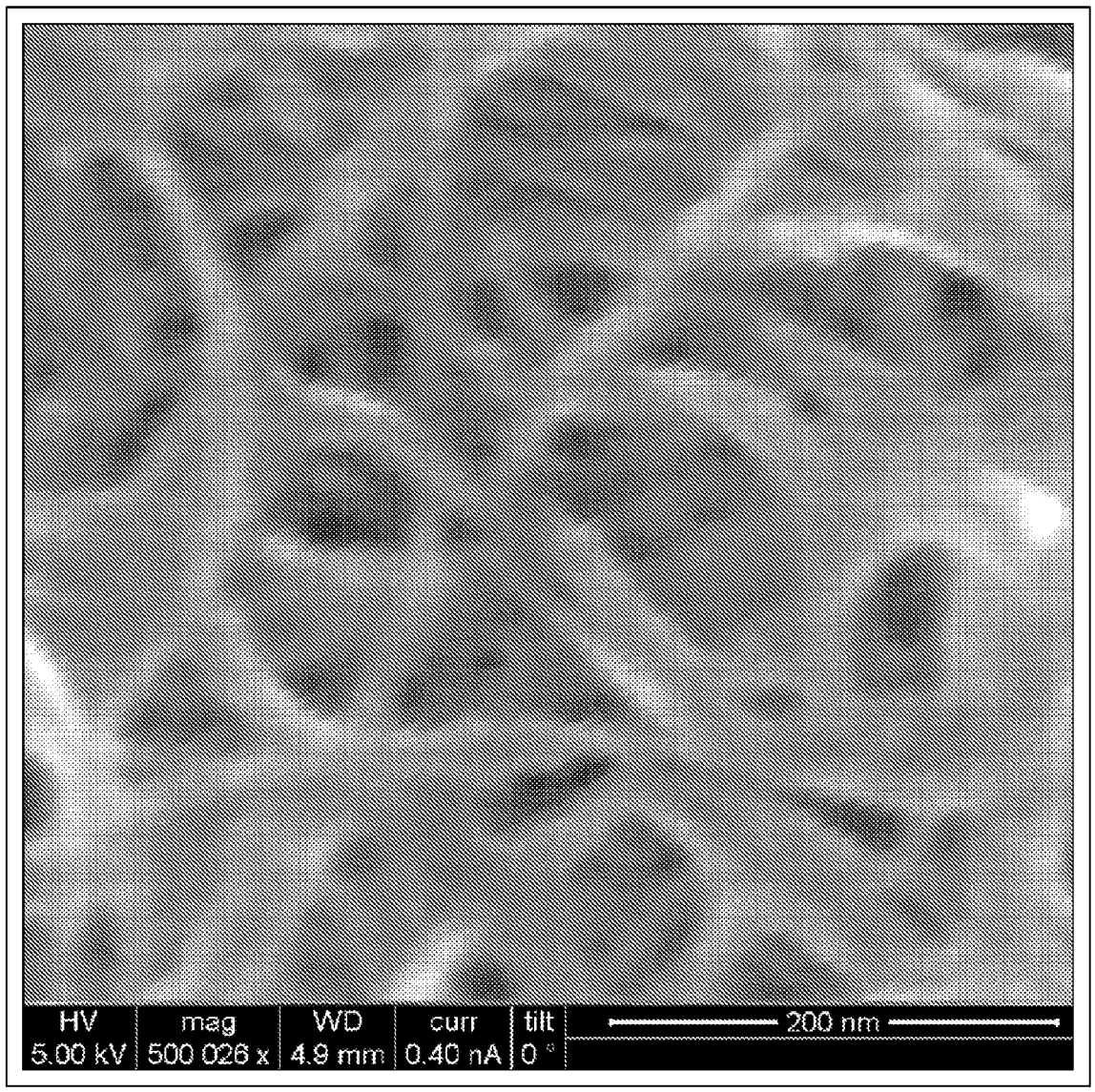
FIG. 20B is an SEM image of the deposition of dispersed carbon nanotube within nanocomposites imaged at high (500,000 times) magnification.

While many different thin film fabrication techniques have been developed (e.g., spin coating, vacuum filtration, melt-pressing and annealing, among others), layer-by-layer self-assembly permits the homogeneous deposition of nanomaterials and polyelectrolyte species onto virtually any substrate and geometry. In short, as discussed herein, LbL is performed by sequentially immersing a charged substrate (e.g., glass metal, polymers, or FR4 laminates) into oppositely charged solutions containing functional nanomaterials (FIG. 19). When exposed to each solution, electrostatic and van der Waals force interactions drive the adsorption of various materials to form nanometer-thick monolayer thin films. Through the continuous repetition of this cyclic adsorption process, a variety of materials such as individually dispersed carbon nanotubes and poly(aniline) can be incorporated to yield nanocomposites encoded with specific engineering functionalities. Scanning electron microscope (SEM) images of LbL-assembled carbon nanotube composites verify the adsorption of individual or small bundles of carbon nanotubes within the polymeric matrix (FIG. 20).

More specifically, prior to LbL assembly, printed circuit boards (FR4 laminates) are thoroughly rinsed and cleansed with 18 MΩ deionized water (Milli-Q). Nanocomposite assembly begins by dipping the FR4 laminate in a positively charged 1.0 mg-mL−1 poly(aniline) emeraldine base solution in 10 vol. % N,N-dimethyl formamide (DMF) for 5 min. Then, the FR4 substrate, along with its adsorbed monolayer, are rinsed with 18 MΩ deionized water (3 min) to remove loosely adsorbed polyelectrolytes and dried using compressed air for 10 minutes. Deposition of the next oppositely charged LbL counterpart continues by immersing the substrate into a solution consisting of 0.8 mg-mL−1 SWNTs ultrasonically dispersed in 1.0 wt. % poly(sodium 4-styrene sulfonate) (PSS, Mw=1,000,000). The present teachings have validated the dispersion quality of nanotubes in polyelectrolyte solutions such as PSS. Finally, upon rinsing (3 min) and drying (10 min), one bilayer of (SWNT-PSS/PANI)1 thin film is deposited onto the FR4 laminate substrate (where the subscript indicates the number of bilayers fabricated). Typically, the LbL technique is repeated 50 to 200 times to fabricate mechanically strong and chemically resistant thin films capable of withstanding exposure to multiple cycles of highly acidic and alkaline solutions.

7. Nanocomposite Sensor Characterization

7.1. Time-Domain pH Sensing Characterization

Initially, demonstration of (SWNT-PSS/PANI)n thin films' electrochemical sensitivity to applied pH buffer solutions is accomplished by depositing 50-bilayer LbL thin films upon a clean glass substrate. Copper tape (Ted Pella) electrodes are affixed onto two ends of the $(SWNT-PSS/PANI)_{50}$ thin film to achieve a two-point probe setup. In addition, contact impedance is minimized by applying colloidal silver paste (Ted Pella) over the copper tape and nanocomposite. Then, a plastic well (7 mm diameter) is securely mounted over the thin film surface via vacuum grease (Dow Corning). Changes in thin film electrical resistance due to pH buffer solutions added to the well is measured with an Agilent 34401a digital multimeter supplying 10 nA of direct current (DC) while sampling at 1 Hz.

Figure 22:
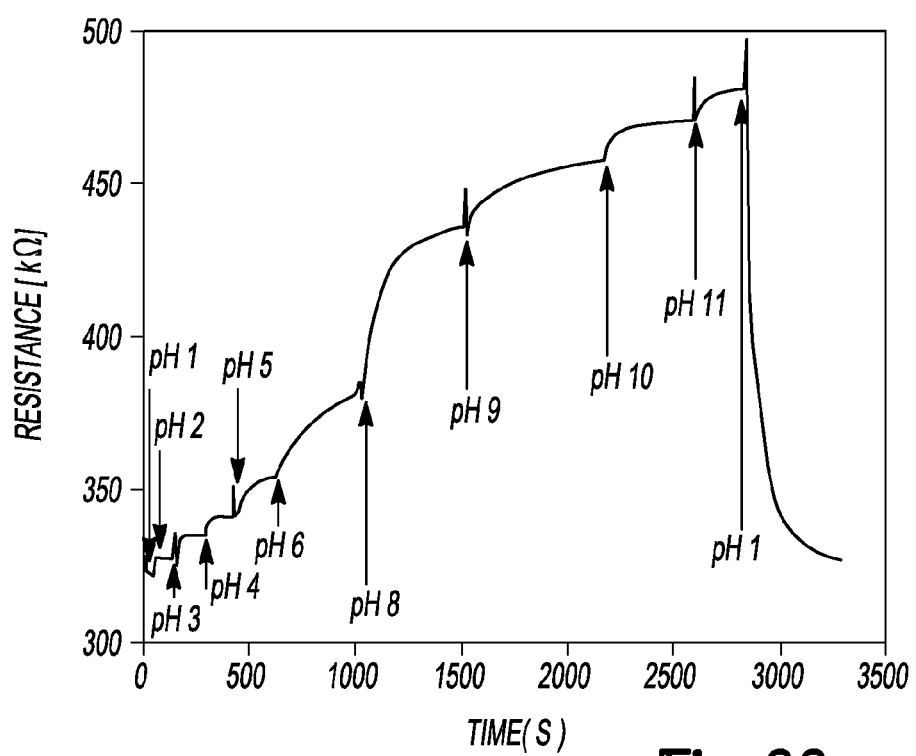
FIG. 22 is a graph illustrating the two-point probe time history response of a (SWNT-PSS/PANI)$_{50}$ thin film subjected to pH 1 to 11 buffer solutions.

FIG. 22 plots the time history of the thin film resistance to applied pH buffer solutions. Initially, the thin film is exposed to a pH 1 buffer solution. Upon observing steady-state resistance output, the buffer solutions is removed at which point the next pH buffer solution is pipeted into the well. From FIG. 22, it can be observed that the $(SWNT-PSS/PANI)_{50}$ nanocomposite exhibits dramatic changes in resistance as a function of pH. More importantly, upon pipetting in a pH 11 solution, the immediate addition of fresh pH 1 solution causes the film resistance to decrease back to the film's nominal resistance, thereby suggesting that the nanocomposite response is repeatable. Changes in film conductivity (the inverse of resistivity) are due to deprotonization of the aniline chains embedded within the nanocomposite.

7.2. Frequency-Domain pH Sensing Characterization

Figure 21:
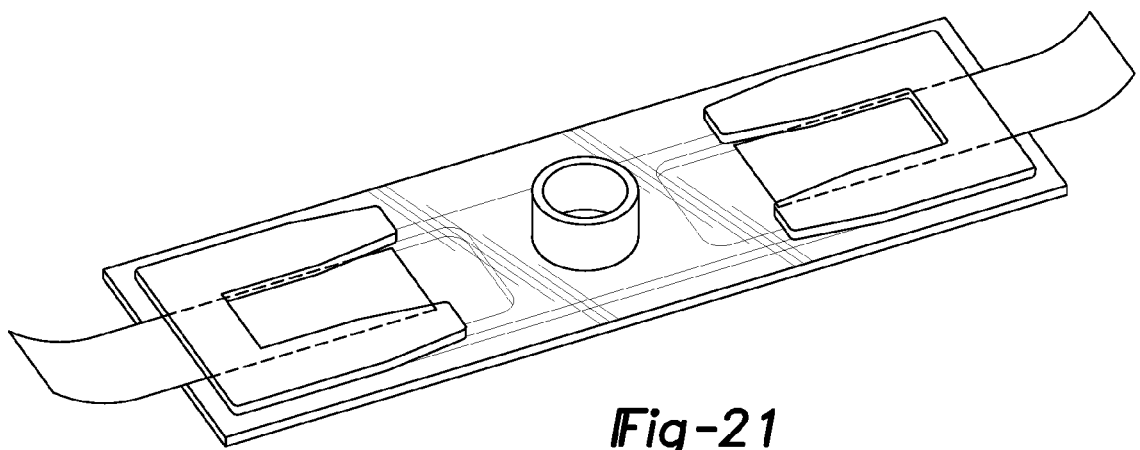
FIG. 21 is a photograph of a two-point probe setup using copper tape and silver paste electrically connected to a (SWNT-PSS/PANI)$_{50}$ specimen for time-domain resistance measurement as a function of pH.

While DC time-domain electrical characterization has already revealed the high sensitivity of $(SWNT-PSS/PANI)_n$ nanocomposite's resistivity to pH, frequency-domain evaluation can reveal other changes in the film's electrical properties (e.g., capacitance or inductance). In fact, the Solartron 1260 impedance gain/phase analyzer can be employed to conduct electrical impedance spectroscopy for characterizing frequency-domain electrical properties of the present nanocomposites. As opposed to measuring a reader coil antenna's complex impedance, the FRA is directly connected to the thin film specimen shown in FIG. 21. By applying a regulated AC voltage signal of the form P(t)=V0 sin(ωt), the measured steady-state current response of the form i(t)=sin(ωt+θ) (where θ is the phase difference between the input and output AC signals) is employed to determine the specimen's complex impedance. Then, the Solartron impedance analyzer is commanded to measure nanocomposite impedance between applied AC signal frequencies from 1 to 10 MHz. Upon determination of thin film complex impedance at every frequency interval, the real and imaginary components of Z(ω) can be calculated using Equation 9:

$$Z_{real} = Z' = \|Z\| co \quad (9a)$$

$$Z_{imaginary} = Z'' = \|Z\| z \quad (9b)$$

Figure 23:
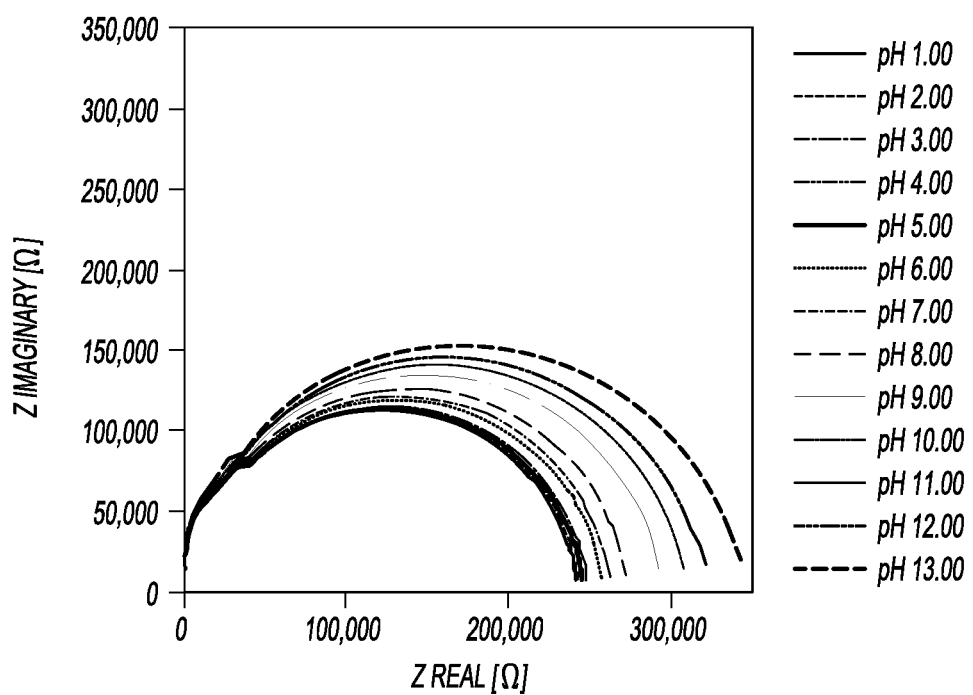
FIG. 23 are electrical impedance spectroscopic plots showing the (SWNT-PSS/PANI)$_{50}$ thin films increase their parallel resistance with increasing pH (pH 1 to 13)
Figure 23:
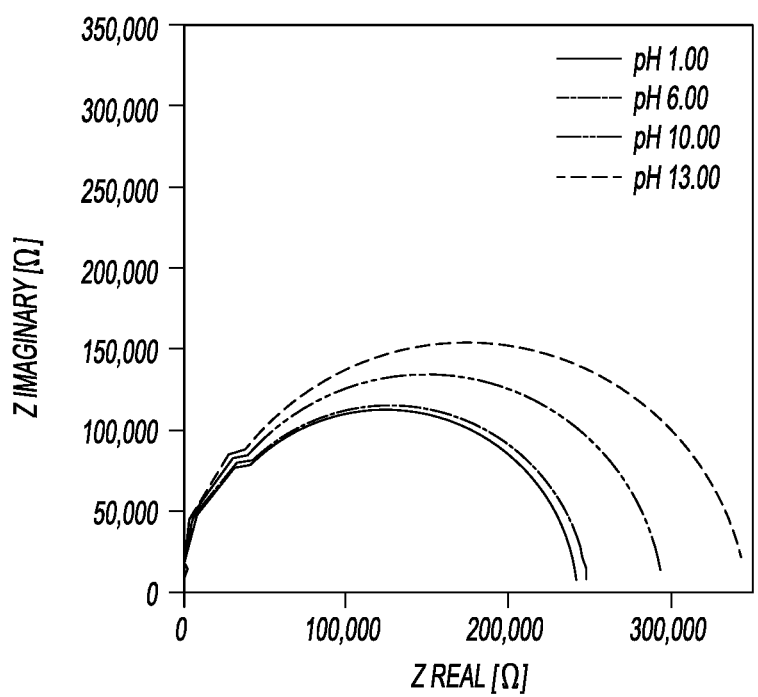
Figure 24:
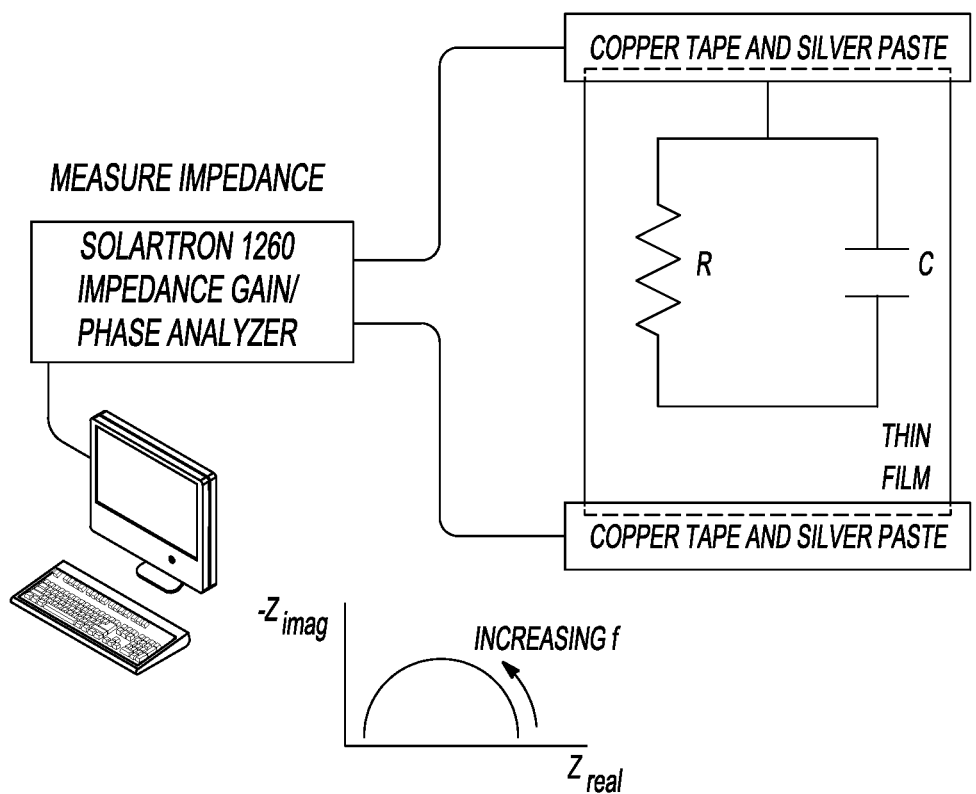
FIG. 24 is an equivalent parallel-RC circuit model derived for simulated annealing model-fitting of nanocomposite EIS Cole-Cole plot response.

FIG. 23 plots the experimental response of EIS measurements of an $(SWNT-PSS/PANI)_{50}$ nanocomposite subjected to buffer solutions ranging from pH 1 to 13. The semicircular thin film EIS response in the complex impedance plane (termed the Cole-Cole plot) suggests that these thin films exhibit a resistor-capacitor (RC) parallel circuit-type behavior (FIG. 24). It is expected that an increase in the Cole-Cole semicircular plot radius with increasing pH suggests an increase in resistance of the parallel-RC circuit.

Figure 25:
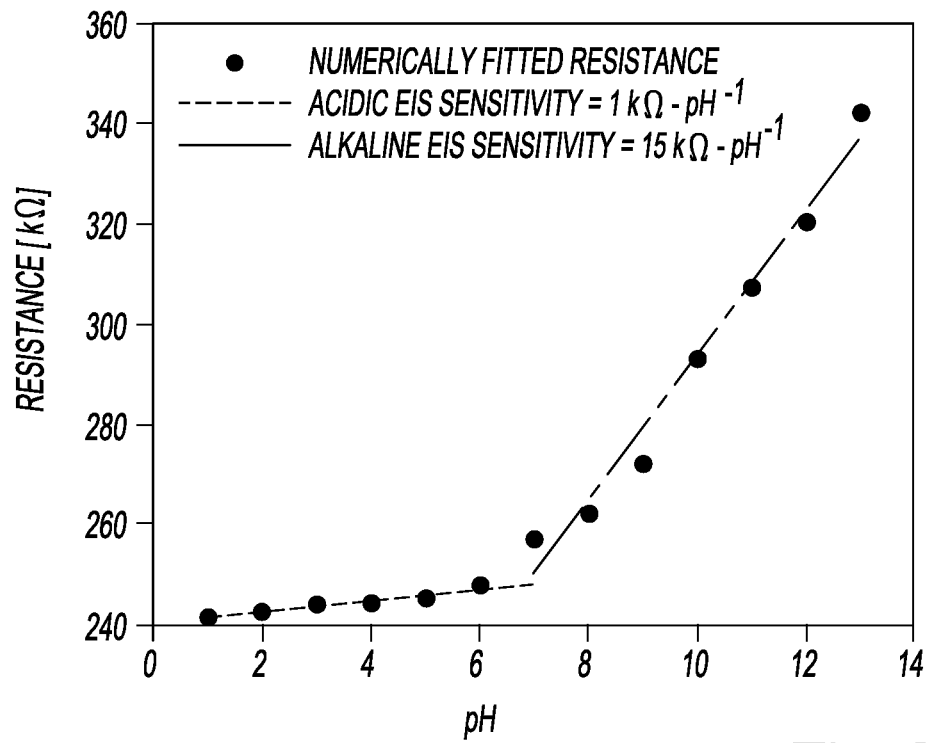
FIG. 25 is a plot of model-fitted equivalent circuit resistance as a function of applied pH buffer solutions indicating bilinear pH sensitivity.

Thus, each Cole-Cole plot is numerically fitted to an equivalent circuit schematically shown in FIG. 24 using a stochastic simulated annealing model-updating algorithm to deduce values for the equivalent resistance and capacitance of the $(SWNT-PSS/PANI)_{50}$ nanocomposite pH sensor. Similar equivalent circuit analysis of carbon nanotube-based composites has been conducted and validated by the present teachings. Upon model-fitting of EIS thin film response to applied pH buffer solutions, the results are summarized as shown in FIG. 25. The LbL thin film's frequency-domain equivalent resistance exhibits a bilinear response to pH, where lower sensitivity is observed for acidic pH solutions (1 kΩ-pH−1) but dramatically increases when exposed to basic solutions (15 kΩ-pH−1 as shown in FIG. 25). It should be noted that no obvious trends are identified for capacitance change with varying pH but rather remains constant at 1.7 pF. These results suggest a parallel resonant circuit configuration can achieve maximum RFID bandwidth change as a function of pH (Equation 3b).

8. Passive Wireless pH Sensing

Figure 26:
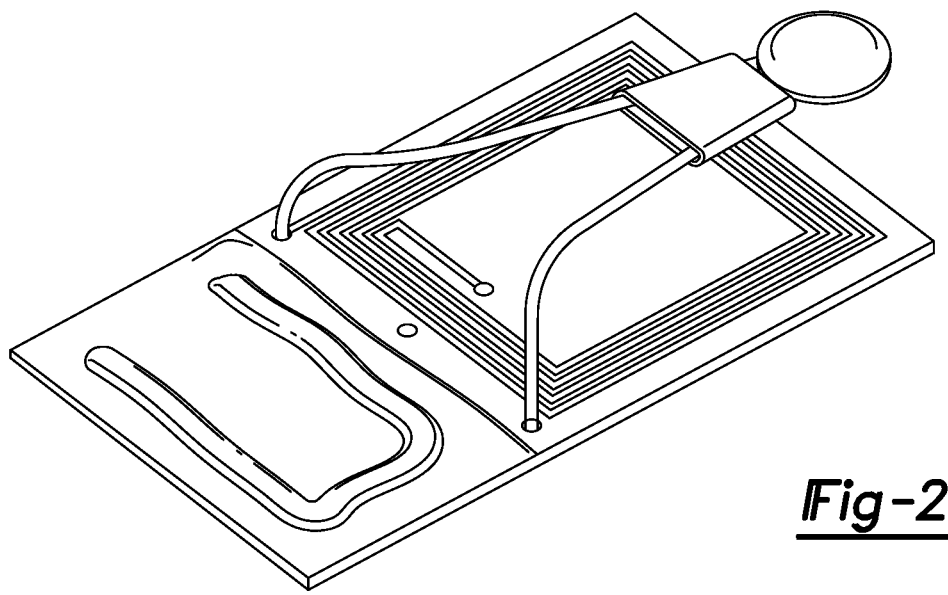
FIG. 26 is a photograph of a layer-by-layer assembly employed to deposit (SWNT-PSS/PANI)$_{50}$ thin films directly onto PCB coil antennas to realize a passive wireless RFID pH/corrosion sensor tag of small form factor.

In some embodiments, nanocomposite strain and pH sensors have been coupled with 45 and 70 mm coil antennas formed from wound magnetic wire for validating passive wireless sensing and communications. Preliminary results indicate that an RFID reader can interrogate these sensors and detect system bandwidth change due to applied strain (+10,000µε) or pH (1 to 10). However, the large form factor of these coil antennas makes them unrealistic for embedment within structural components. As a result, the main objective of this study is to take advantage of the versatility of LbL to deposit nanocomposite sensors on substrates such as PCB planar coil antennas. The end result is a thin and compact pH/corrosion RFID sensor tag that is suitable for embedding in structural materials such as reinforced concrete (FIG. 26).

In some embodiments, realization of the RFID reader is achieved by coupling a PCB coil antenna (~2.6 pH) with the Solartron 1260 impedance gain/phase analyzer. The FRA is programmed to apply an AC sinusoidal excitation (regulated 3V voltage) from 1.5 to 5.5 MHz to interrogate the present sensor tag while simultaneously measuring changes in the reader's complex impedance. For the sensor tag shown in FIG. 26, a 1,000 pF leaded ceramic capacitor is soldered to the PCB substrate to tune the resonant frequency to ~3.0 MHz and bandwidth to ~250 kHz. Laboratory validation of passive wireless pH sensing is conducted by exposing the nanocomposite-coated portion of the tag (FIG. 26) to buffer solutions of various pH levels (pH 1 to 11). It should be noted that strong bases are avoided in this preliminary study while FR4 laminate chemical resistance tests are currently underway. In addition, the reader and tag are aligned at their coil axes and are separated by 5 to 15 mm.

Figure 27:
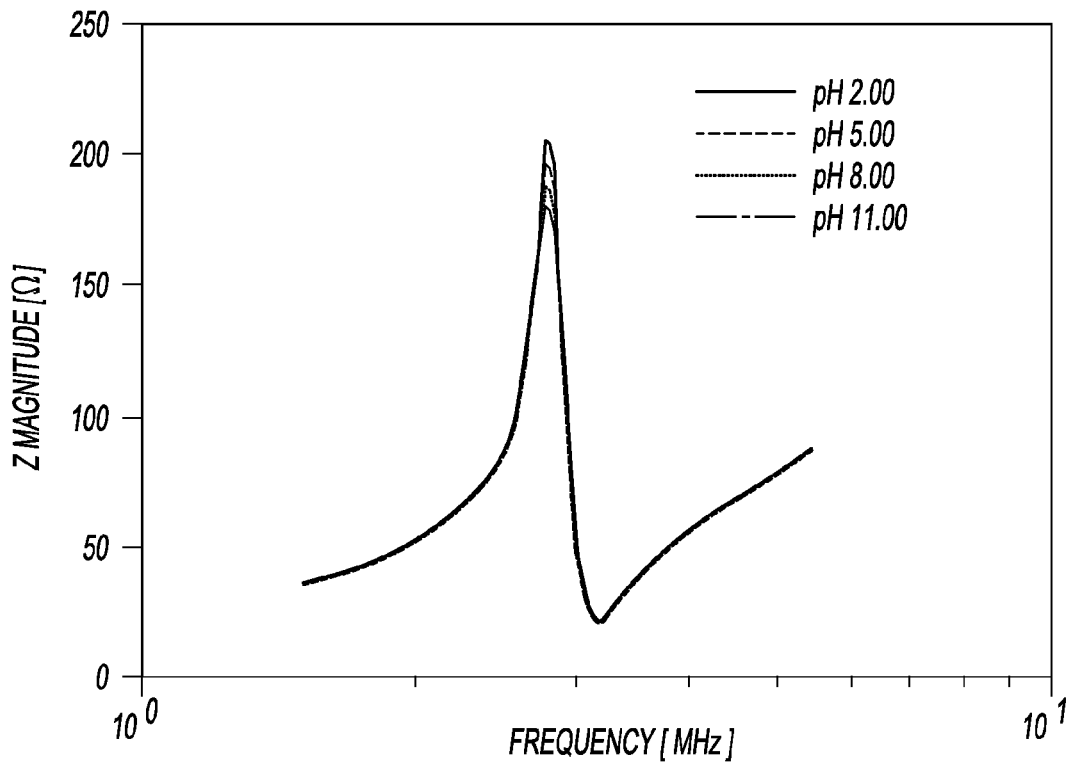
FIG. 27 is a select Bode plot measured by the RFID reader illustrating sensor response to various applied pH buffer solutions.
Figure 28:
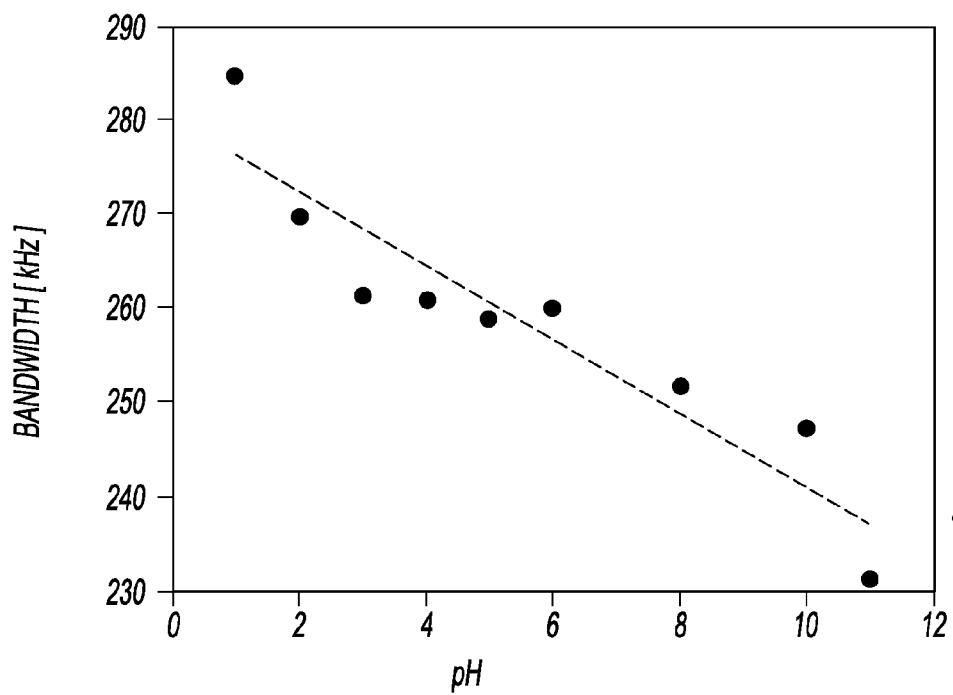
FIG. 28 is a graph illustrating that the RFID system bandwidth decreases with increasing pH buffer solutions, wherein the sensitivity of the system is approximately 3.9 kHz-pH-1.

FIG. 27 plots the passive wireless pH sensor's impedance-frequency response (termed a Bode plot) as determined by the RFID reader. It should be noted that only select plots are presented to enhance the clarity of the printed figure. From FIG. 27, it can be clearly seen that inductive coupling between the reader and tag is observed near the sensor tag's 3.0 MHz characteristic frequency as expected. As the sensor tag is exposed to increasing alkaline pH buffer solutions (1 to 11), the maximum detected impedance magnitude decreases while the bandwidth of the reader-tag system increases; FIG. 28 summarizes system bandwidth dependency to applied pH. Thus, as the nanocomposite's resistance increases with increasing pH (FIG. 25), RFID bandwidth decreases in accordance with Eq. 3b. Although bandwidth change is nonlinearly related to pH, a linear least-squares fit can be obtained to estimate the inductively coupled sensor sensitivity to be 3.9 kHz-pH−1. This high estimated pH sensitivity suggests that these passive wireless sensors hold promise for applications in field environments to monitor corrosion.

As mentioned earlier, the sensor tag's FR4 laminates are currently being evaluated to endure harsh environmental conditions (strong acids and bases). In the near future, the sensor tag and reader coil antenna will be optimized to further enhance sensor read range and system bandwidth change. Moreover, these nanocomposite PCB RFID tags have already been embedded within reinforced concrete structures to detect corrosion (pH changes) during accelerated corrosion tests.

9. Conclusions

A (SWNT-PSS/PANI)$_n$ layer-by-layer nanocomposite has been present for pH and corrosion monitoring. Extensive DC time-domain and AC frequency-domain studies have been conducted to evaluate sensor performance to detect pH buffer solutions from pH 1 to 13. Results from DC two-point probe resistance measurements, AC electrical impedance spectroscopy, and equivalent circuit analyses have confirmed that thin film resistance increases in tandem with increasingly applied pH buffer solutions. However, the sensor does exhibit bilinear sensitivity to pH, such that the nanocomposite is only moderately sensitive to acidic solutions, but its electrical resistance can increase dramatically in alkaline environments.

Upon sensor characterization, passive wireless sensing is accomplished by directly depositing these thin film pH sensors onto PCB coil antennas. Wireless interrogation has been successfully validated to detect sensor tags tuned to a 3.0 MHz characteristic frequency and 250 kHz bandwidth. When these RFID tags are exposed to pH buffer solutions (pH 1 to 11), the sensor's bandwidth decreases with increasing pH, exhibiting a pH sensitivity of 3.9 kHz-pH−1. The results presented show promise for passive wireless pH detection for structural health monitoring. Work is underway to embed these passive wireless sensors in reinforced concrete structures to detect environmental parameters conducive to steel-reinforcement corrosion.

10. Conductive Carbon Nanotube-Gold Thin Film

In some embodiments, fabrication of a multifunctional thin film passive wireless sensor is accomplished by utilizing an adsorption-based layer-by-layer self-assembly technique to create an inductively coupled wireless thin film strain and pH sensor derived from an LbL assembled SWNT-gold nanoparticle (GNP) nanocomposite. Through the sequential dipping of a charged glass substrate in oppositely charged polycationic (GNPs in poly(vinyl alcohol) (PVA) or polyaniline (PANI)) and polyanionic solutions (SWNTs in sodium dodecyl sulfate (SDS)), a homogeneous multilayer thin film of controlled morphology can be assembled. In some embodiments, (SWNT-SDS/PANI) resistive pH sensors and (SWNT-SDS/PVA) capacitive strain sensors are presented. Finally, GNPs are employed (FIG. 1) to enhance bulk conductivity for wireless operations.

A Solartron 1260 impedance gain/phase analyzer coupled with a reader coil antenna is employed to wirelessly interrogate a capacitive SWNT-SDS/PVA strain sensor and the resistive SWNT-SDS/PANI pH sensor. First, the SWNT-SDS/PVA strain sensor is epoxy mounted to a PVC bar and loaded in a load frame to apply a tensile-compressive cyclic load pattern to ±10,000 µm/m. Upon measuring the coupled reader-sensor impedance frequency response function, extraction of sensor resonant frequency (Eq. 1) at each applied strain is accomplished by observing the inflection point of the raw data (FIG. 2). From FIG. 3a, it can be seen that the strain sensor exhibits near-linear $f_n$ shift with a strain sensitivity of 0.427 Hz/µm/m−1.

pH sensing is accomplished by initially mounting plastic wells onto the surface of SWNT-SDS/PANI thin films where a range of pH buffer solutions (1-10) are pipetted into the pH wells. Upon numerical fitting of experimental results to theory with a stochastic simulated annealing model-updating algorithm, the bandwidth of the pH sensor can be extracted (Eq. 2) and plotted as a function of pH (FIG. 3b). Since the resistive pH sensor response is inherently nonlinear (Eq. 2), it is appropriate to conclude that the pH sensor's bandwidth changes from 270 to 25 Hz as pH is varied from 1 to 10. By coupling the strain and pH sensor to a coil-patterned SWNT-GNP thin film, a complete LbL-based multifunctional wireless sensor is realized.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for sensing a stimulus, said method comprising:
    providing a sensing assembly having a first structure and a second structure, said first structure being made of a material different than said second structure, each of said first structure and said second structure being of nanoscale;
    providing an inductive antenna operably and physically coupled to said sensing assembly;
    disposing said sensing assembly upon a spatial area;
    exposing said sensing assembly to the stimulus thereby producing a detectable physical change in capacitance in said sensing assembly; and
    wirelessly and electromagnetically coupling a reader with said inductive antenna such that said reader wirelessly powers said sensing assembly to obtain a signal by virtue of said electromagnetic coupling representative of said detectable physical change in said sensing assembly.

2. The method according to claim 1 wherein said providing a sensing assembly comprises fabricating said sensing assembly via a layer-by-layer technique.

3. The method according to claim 1 wherein said providing a sensing assembly comprises fabricating said sensing assembly via a method chosen from the group consisting essentially of melt-pressing, thermosetting, extrusion, in situ polymerization, evaporation, thermal annealing, vacuum filtration, spin coating, mold casting, spray coating, painting, Langmuir-Blodgett, sol gel, and dip coating.

4. The method according to claim 1 wherein said providing a sensing assembly having a first structure and a second structure comprises providing a sensing assembly having a first structure and a second structure, wherein said first structure and said second structure are each chosen from the group consisting of nanotube, nanofiber, nanoparticle, nanowire, quantum dot, biological molecule, polymer, and combinations thereof.

5. The method according to claim 1 wherein said providing an inductive antenna operably coupled to said sensing assembly comprises providing an inductive antenna disposed on a substrate, separate from said sensing assembly.

6. The method according to claim 1 wherein said providing an inductive antenna operably coupled to said sensing assembly comprises providing an inductive antenna integrally formed with said sensing assembly.

7. The method according to claim 1 wherein said providing a sensing assembly having a first structure and a second structure comprises providing a sensing assembly having a first structure, a second structure, and a third structure being a conductive nano-particle.

8. The method according to claim 1 wherein said providing a sensing assembly having a first structure and a second structure comprises providing a sensing assembly having a first structure and a second structure, said second structure being a conductive nano-particle.

9. A method for sensing a stimulus, said method comprising:
    providing a sensing assembly having a first structure and a second structure, said first structure being made of a material different than said second structure, each of said first structure and said second structure being of nanoscale;
    providing a passive wireless radio frequency identification system operably coupled with said sensing assembly;
    disposing said sensing assembly upon a spatial area;
    exposing said sensing assembly to the stimulus thereby producing a detectable physical change in capacitance in at least one of said first structure and said second structure of said sensing assembly; and
    wirelessly and electromagnetically coupling a reader with said passive wireless radio frequency identification system such that said reader wirelessly powers said sensing assembly to obtain an analog signal by virtue of said electromagnetic coupling representative of said detectable physical change in said sensing assembly.

10. The method according to claim 9 wherein said providing a sensing assembly comprises fabricating said sensing assembly via a layer-by-layer technique.

11. The method according to claim 9 wherein said providing a sensing assembly comprises fabricating said sensing assembly via a method chosen from the group consisting essentially of melt-pressing, thermosetting, extrusion, in situ polymerization, evaporation, thermal annealing, vacuum filtration, spin coating, mold casting, spray coating, painting, Langmuir-Blodgett, sol gel, and dip coating.

12. The method according to claim 9 wherein said providing a sensing assembly having a first structure and a second structure comprises providing a sensing assembly having a first structure and a second structure, wherein said first structure and said second structure are each chosen from the group consisting of nanotube, nanofiber, nanoparticle, nanowire, quantum dot, biological molecule, polymer, and combinations thereof.

13. The method according to claim 9 wherein said providing a passive wireless radio frequency identification system operably coupled to said sensing assembly comprises providing a passive wireless radio frequency identification system having an inductive antenna disposed on a substrate, separate from said sensing assembly.

14. The method according to claim 9 wherein said providing a passive wireless radio frequency identification system operably coupled to said sensing assembly comprises providing a passive wireless radio frequency identification system having an inductive antenna integrally formed with said sensing assembly.

15. The method according to claim 9 wherein said providing a sensing assembly having a first structure and a second structure comprises providing a sensing assembly having a first structure, a second structure, and a third structure being a conductive nano-particle.

16. The method according to claim 9 wherein said providing a sensing assembly having a first structure and a second structure comprises providing a sensing assembly having a first structure and a second structure, said second structure being a conductive nano-particle.

17. A method for sensing a stimulus, said method comprising:
- providing a nano-scale sensing assembly having a single-walled carbon nanotubes dispersed in N,N-dimethyl formamide casted with poly(vinyledene fluoride);
- providing a passive wireless radio frequency identification system operably coupled with said sensing assembly;
- disposing said sensing assembly upon a spatial area;
- exposing said sensing assembly to the stimulus thereby producing a detectable physical change in capacitance in said sensing assembly; and
- wirelessly and electromagnetically coupling a reader with said passive wireless radio frequency identification system such that said reader wirelessly powers said nano-scale sensing assembly to obtain an analog signal by virtue of said electromagnetic coupling representative of said detectable physical change in said sensing assembly.

18. The method according to claim 17 wherein said providing a passive wireless radio frequency identification system operably coupled to said sensing assembly comprises providing a passive wireless radio frequency identification system having an inductive antenna disposed on a substrate, separate from said sensing assembly.

19. The method according to claim 17 wherein said providing a passive wireless radio frequency identification system operably coupled to said sensing assembly comprises providing a passive wireless radio frequency identification system having an inductive antenna integrally formed with said sensing assembly.

\* \* \* \* \*

UNITED STATES PATENT AND TRADEMARK OFFICE
CERTIFICATE OF CORRECTION

| | | |
|---|---|---|
| PATENT NO. | : 8,451,124 B2 | Page 1 of 1 |
| APPLICATION NO. | : 12/209330 | |
| DATED | : May 28, 2013 | |
| INVENTOR(S) | : Lynch et al. | |

It is certified that error appears in the above-identified patent and that said Letters Patent is hereby corrected as shown below:

On the title page item (56), Under Other Publications column 2, line 7, delete "Thick" and insert --"Thick--.

On the title page item (56), Under Other Publications column 2, line 7, delete "Sensor" and insert --Sensor"--.

In the Specifications:

Column 8, line 6, delete "deru" and insert --der--.

Column 9, table 2, line 46 (approx.), delete "ml" and insert --mL--.

Column 9, table 2, line 49 (approx.), delete "ml" and insert --mL--.

Column 10, line 7, delete "+10,000" and insert --±10,000--.

Column 10, line 58, delete "pH" and insert --µH--.

Column 14, line 64, delete "2.6 pH" and insert --2.6 µH--.

Column 17, lines 13-14, delete "(+10,000µε)" and insert --(±10,000 µε)--.

Column 17, line 24, delete "pH" and insert --µH--.

Signed and Sealed this
Third Day of September, 2013

Teresa Stanek Rea
*Acting Director of the United States Patent and Trademark Office*